United States Patent [19]

Stump

[11] Patent Number: 5,553,407
[45] Date of Patent: Sep. 10, 1996

[54] EXCAVATOR DATA ACQUISITION AND CONTROL SYSTEM AND METHOD OF USE

[75] Inventor: Greg Stump, Oakland, Ill.

[73] Assignee: Vermeer Manufacturing Company, Pella, Iowa

[21] Appl. No.: 491,679

[22] Filed: Jun. 19, 1995

[51] Int. Cl.$^6$ .................................. E02F 5/06; E02D 3/12
[52] U.S. Cl. ........................ 37/348; 364/424.07; 414/694
[58] Field of Search .......................... 37/352, 355, 357, 37/347, 348, 900, 902; 172/4, 4.5, 7; 405/128, 157, 234, 267; 364/424.07; 414/685, 694, 687, 697, 699, 700

[56] References Cited

U.S. PATENT DOCUMENTS

| | | | |
|---|---|---|---|
| 4,676,695 | 6/1987 | Duthweiler | 405/157 |
| 5,365,442 | 11/1994 | Schmidt | 37/348 X |
| 5,370,478 | 12/1994 | Bartlett et al. | 405/128 |
| 5,410,252 | 4/1995 | Potter et al. | 324/345 |
| 5,471,771 | 12/1995 | Gilbert | 37/352 |

OTHER PUBLICATIONS

Kathage, A. F., Proceedings of the Fourth International Conference on Ground Penetrating Radar, Geological Survey of Finland, *A Challenge: GPR In Advance of Horizontal Drilling*, Special Paper 16, Jun., 1992, pp. 119–124.

Guenther, M. and Kathage, A. F., Proceedings of the Fifth Internations Conference on Ground Penetrating Radar, *The Geophysical Investigation of Drilling Obstacles For Microtunnelling Projects by Means of GPR*, vol. 3 of 3, Jun., 1994, pp. 1151–1165.

CHEMRAD Tennessee Corporation, *USRADS Series 2100*, Brochure. (no date).

Fenning, et al., *Geophysical Methods For The Location Of Underground Storage Tanks*, Article. (no date).

Geophysical Survey Systems, Inc., *Radan™—Radar Data Analyzer*, Production Information Sheet, Jan., 1993.

Geophysical Survey Systems, Inc., *Subsurface Solutions*, Winter 1995.

Geophysical Survey Systems, Inc., *Sir® System–2 Subsurface Interface Radar*, Brochure. (no date).

Geophysical Survey Systems, Inc., *Sir® System–10A Subsurface Interface Radar*, Brochure. (no date).

Geophysical Survey Systems, Inc., *Sir® System Antennas*, Brochure. (no date).

(List continued on next page.)

*Primary Examiner*—Terry Lee Melius
*Assistant Examiner*—Robert Pezzuto
*Attorney, Agent, or Firm*—Merchant, Gould, Smith, Edell, Welter & Schmidt, P.A.

[57] ABSTRACT

An excavator data acquisition and control system and process for characterizing the subsurface geology of an excavation site, and for utilizing the acquired data to optimize the production performance of an excavator. A geologic imaging system and a geographic positioning system are employed to initially survey a predetermined excavation site or route. A geologic characterization unit may also be employed to enhance the geologic imaging data. The acquired data are processed to provide detailed geologic and position data for the excavation site and utilized by a main control unit to optimize excavator production performance. In one embodiment, the main control unit accesses a geologic filter database, which includes geologic profile data for numerous types of geology, when analyzing unknown subsurface geology. Removing geological filter data content corresponding to known geology from the acquired geologic imaging data provides for immediate recognition of unknown and suspect subsurface objects. The geologic imaging system preferably includes a ground penetrating radar system having a plurality of antennas oriented in an orthogonal relationship to provide three-dimensional imaging of subsurface geology. Correlation software is employed to correlate acquired geologic image data to historical excavator production performance data to characterize the structural mechanics of subsurface geology. Accurate geographic mapping of an excavation site is provided by the geographic positioning system which preferably includes a mobile transponder mounted to an excavator and a plurality of ground-based transponders and, in one embodiment, Global Positioning System (GPS) signals.

25 Claims, 20 Drawing Sheets

OTHER PUBLICATIONS

Geophysical Survey Systems, Inc., *Model 3200MLF, Multiple, Low–Frequency, Bistatic Antenna*, Brochure. (no date).

Geophysical Survey Systems, Inc., *Subsurface Detection Problems*, Brochure. (no date).

GeoRadar, Inc., *Model 1000B, Stepped–FM Ground Penetrating Radar*, Brochure. (no date).

Pollution Engineering, *Peering Beneath The Surface*, Article, Oct., 1992.

Sensors & Software, Inc., *Pulse Ekko™ 100, Features*, Brochure. (no date).

Sensors & Software, Inc., *Pulse Ekko™ 100, Ground Penetrating Radar Technology*, Brochure. (no date).

Sensors & Software, Inc., *Pulse Ekko™ 100 Case Studies*, pp. 80–83, 87–94, 98, 100, 129, 131. (no date).

Sensors & Software, Inc., *Pulse Ekko™ 1000*, Brochure. (no date).

Sensors & Software, Inc., *Pulse Ekko™, Environment*, Feb. 1994.

Weil et al., *Investigations of Hazardous Waste Sites Using Thermal IR and Ground Penetrating Radar*, Photogrammetric Engineering & Remote Sensing, vol. 60, No. 8, Aug. 1994, pp. 999–1005.

5,553,407

EXCAVATOR DATA ACQUISITION AND CONTROL SYSTEM AND METHOD OF USE

FIELD OF THE INVENTION

The present invention relates generally to the field of excavation and, more particularly, to a system and process for acquiring geological and positional data, and for controlling an excavator in response to the acquired data.

BACKGROUND OF THE INVENTION

Various types of excavators have been developed to excavate a predetermined site or route in accordance with a particular manner of excavation. One particular type of excavator, often referred to as a track trencher, is typically utilized when excavating long continuous trenches for purposes of installing and subsequently burying various types of pipelines and utility conduits. A land developer or contractor may wish to excavate several miles or even hundreds of miles of terrain having varying types of unknown subsurface geology.

Generally, such a contractor will perform a limited survey of a predetermined excavation site in order to assess the nature of the terrain, and the size or length of the terrain to be excavated. One or more core samples may be analyzed along a predetermined excavation route to better assess the type of soil to be excavated. Based on various types of qualitative and quantitative information, a contractor will generally prepare a cost budget that forecasts the financial resources needed to complete the excavation project. A fixed cost bid is often presented by such a contractor when bidding on an excavation contract.

It can be appreciated that insufficient, inaccurate, or misleading survey information can dramatically impact the accuracy of a budget or bid associated with a particular excavation project. An initial survey, for example, may suggest that the subsurface geology for all or most of a predetermined excavation route consists mostly of sand or loose gravel. The contractor's budget and bid will, accordingly, reflect the costs associated with excavating relatively soft subsurface soil. During excavation, however, it may instead be determined that a significant portion of the predetermined excavation route consists of relatively hard soil, such a granite, for example. The additional costs associated with excavating the undetected hard soil are typically borne by the contractor. It is generally appreciated in the excavation industry that such unforeseen costs can compromise the financial viability of a contractor's business.

Various methods have been developed to analyze subsurface geology in order to ascertain the type, nature, and structural attributes of the underlying terrain. Ground penetrating radar and infrared thermography are examples of two popular methods for detecting variations in subsurface geology. These and other non-destructive imaging analysis tools, however, suffer from a number of deficiencies that currently limit their usefulness when excavating long, continuous trenches, or when excavating relatively large sites. Further, conventional subsurface analysis tools typically only provide an image of the geology of a particular subsurface, and do not provide information regarding the structural or mechanical attributes of the underlying terrain which is critical when attempting to determine the characteristics of the soil to be excavated.

There is a need among developers and contractors who utilize excavation machinery to minimize the difficulty of determining the characteristics of subsurface geology at a predetermined excavation site. There exists a further need to increase the production efficiency of an excavator by accurately characterizing such subsurface geology. The present invention fulfills these and other needs.

SUMMARY OF THE INVENTION

The present invention is an excavator data acquisition and control system and process for characterizing the subsurface geology of an excavation site, and for utilizing the acquired data to optimize the production performance of an excavator. A geologic imaging system and a geographic positioning system are employed to initially survey a predetermined excavation site or route. A geologic characterization unit may also be employed to enhance the geologic imaging data. The acquired data are processed to provide detailed geologic and position data for the excavation site and utilized by a main control unit to optimize excavator production performance. In one embodiment, the main control unit accesses a geologic filter database, which includes geologic profile data for numerous types of geology, when analyzing unknown subsurface geology. Removing geological filter data content corresponding to known geology from the acquired geologic imaging data provides for immediate recognition of unknown and suspect subsurface objects. The geologic imaging system preferably includes a ground penetrating radar system having a plurality of antennas oriented in an orthogonal relationship to provide three-dimensional imaging of subsurface geology. Correlation software is employed to correlate acquired geologic image data to historical excavator production performance data to characterize the structural mechanics of subsurface geology. Accurate geographic mapping of an excavation site is provided by the geographic positioning system which preferably includes a mobile transponder mounted to an excavator and a plurality of ground-based transponders. In one embodiment, signals transmitted by one or more Global Positioning System (GPS) satellites are utilized together with reference signals produced by a plurality of ground-based transponders.

DETAILED DESCRIPTION OF THE PREFERRED EMBODIMENTS

The novel excavator data acquisition and control system and process provides for a substantial enhancement in excavation efficiency and project cost estimation by the acquisition and processing of geological, geophysical, and geographic position information for a particular excavation site. The operation of an excavator is preferably optimized by modifying excavator operating parameters based on acquired survey data and input commands received from an operator of the excavator. The accuracy of estimating the resources and costs associated with excavating a particular excavation site is significantly increased by providing a computational analysis of the acquired survey data prior to initiating excavation of the site, thereby substantially reducing a contractor's risk of misquoting the costs associated with a particular excavation project due to a lack of accurate and detailed information regarding the geology of the subject excavation site.

The advantages and features of a novel excavator data acquisition and control system and process will generally be discussed with reference to one particular type of excavator, termed a track trencher. It is to be understood, however, that a track trencher represents only one of many embodiments of an excavator that may be equipped with a novel excavator data acquisition and control system as disclosed hereinbelow. As such, the advantages and features of the disclosed novel system and process are not limited to application in connection with a track trencher.

Figure 1:
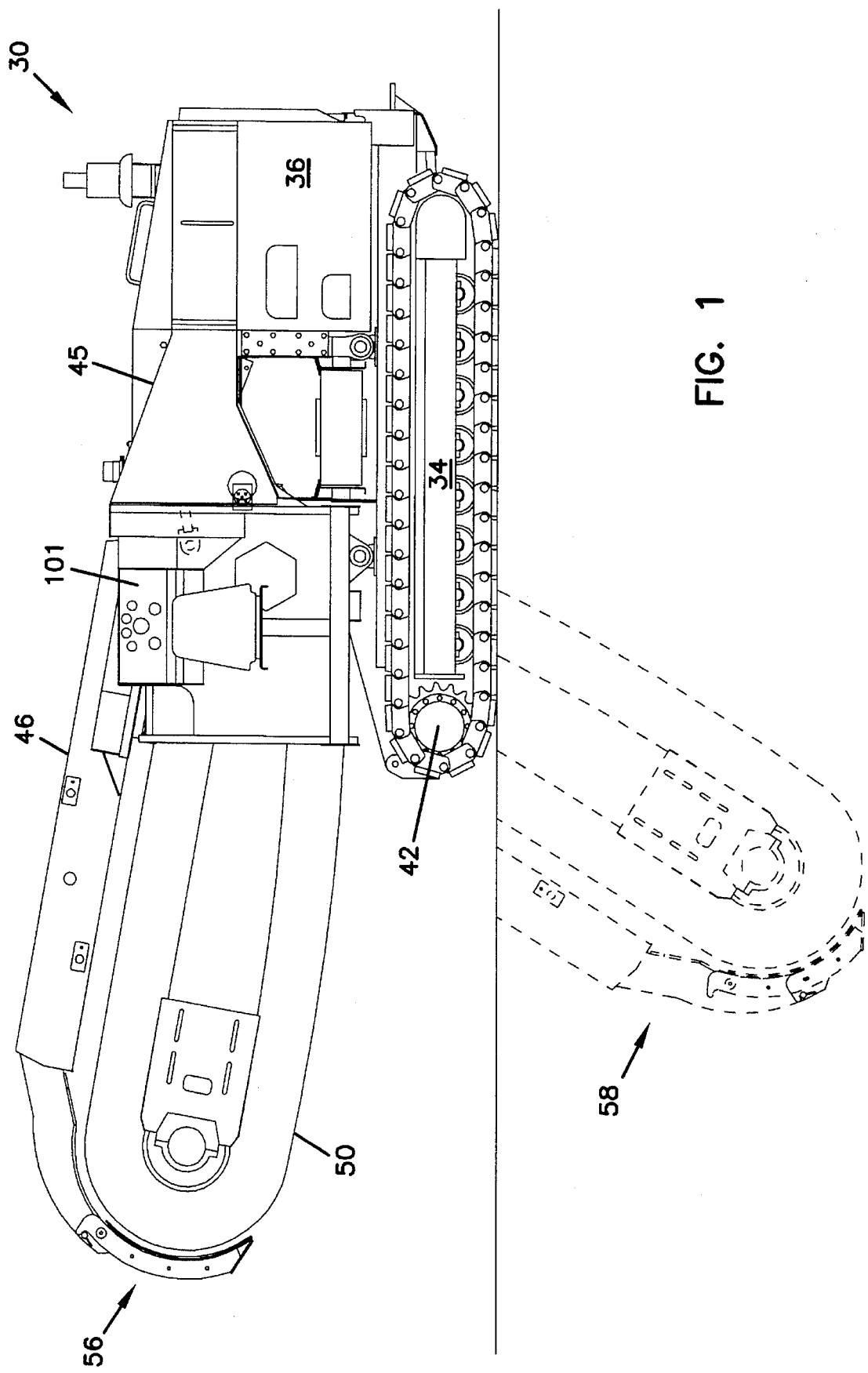
FIG. 1 is a side view of one embodiment of an excavator, termed a track trencher, including a ditcher chain trenching attachment.
Figure 2:
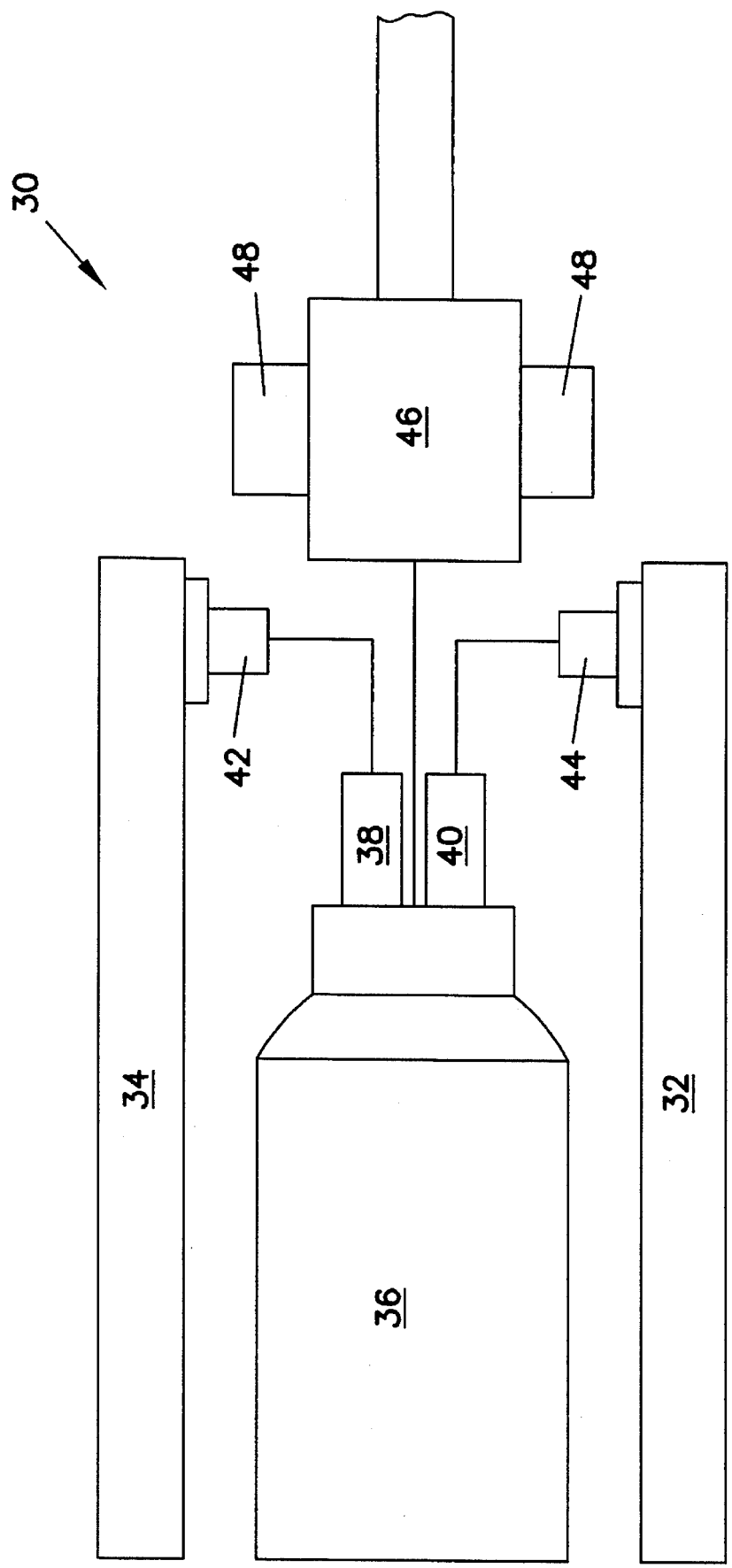
FIG. 2 is a generalized system block diagram of a track trencher embodiment of an excavator.

Referring now to the figures, and more particularly to FIG. 1, there is shown an illustration of one embodiment of an excavator well-suited for incorporating a novel data acquisition and control system. A track trencher excavator, shown in FIGS. 1 and 2, typically includes an engine 36 coupled to a right track drive 32 and a left track drive 34 which together comprise the tractor portion 45 of the track trencher 30. An excavation attachment 46, usually coupled to the front of the tractor portion 45, typically performs a specific type of excavating operation.

A ditcher chain 50, or other excavation attachment, is often employed to dig trenches of varying width and depth at an appreciable rate. The ditcher chain 50 generally remains above the ground in a transport configuration 56 when maneuvering the trencher 30 around an excavation site. During excavation, the ditcher chain 50 is lowered, penetrates the ground, and excavates a trench at the desired depth and speed while in a trenching configuration 58. Another popular trenching attachment, termed a rock wheel in the art, may be controlled in a manner similar to that of the ditcher chain 50. A track trencher 30 is well-suited for efficiently excavating a trench along a predetermined excavation route for the purpose of installing various types of pipelines and utility conduits.

Figure 3:
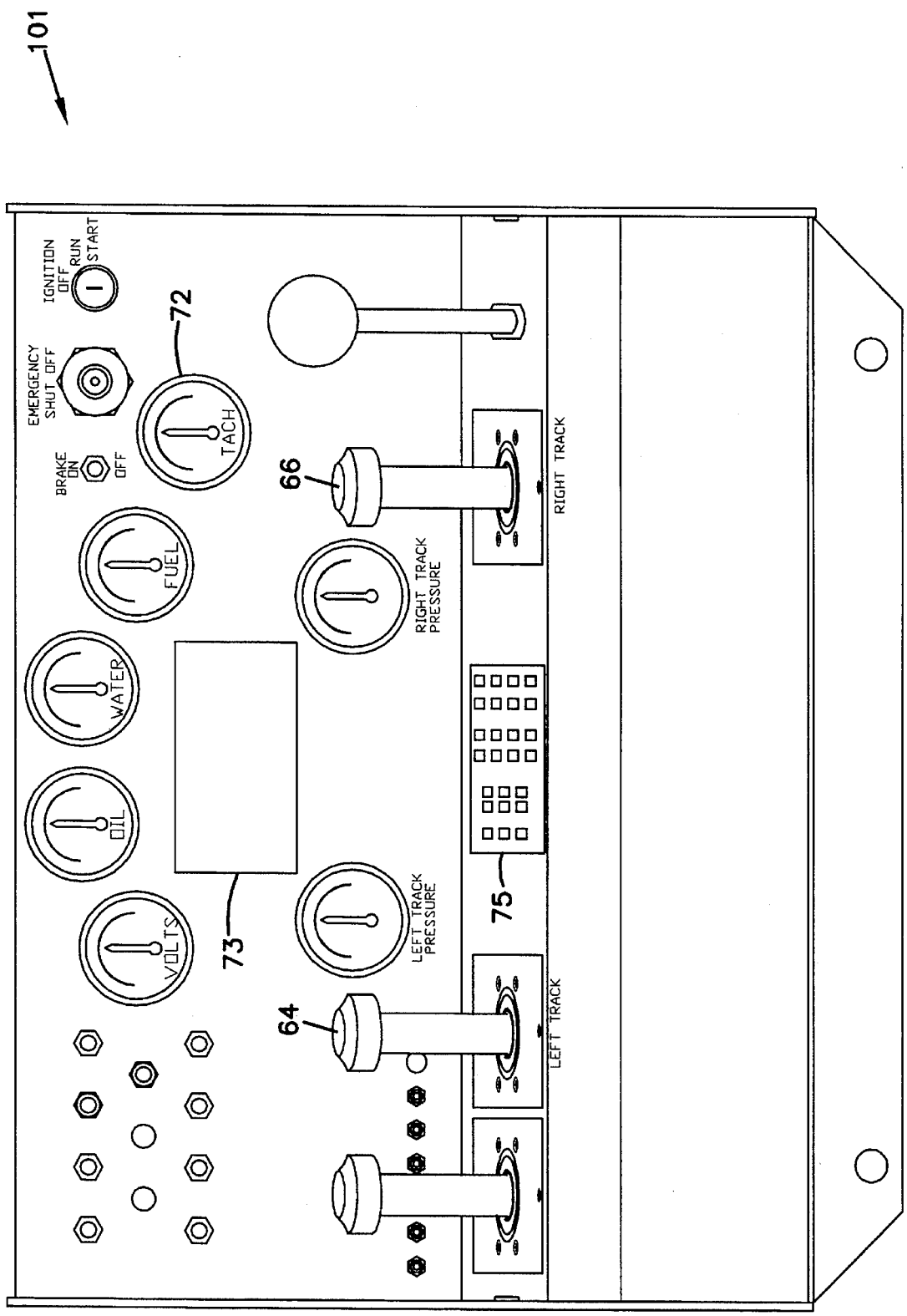
FIG. 3 is an illustration of a main user interface for controlling a track trencher excavator, for viewing acquired geological and position data, and for interfacing with various electronic and electromechanical components of the excavator.

In FIG. 3, there is illustrated a main user interface 101 of a track trencher 30. Propulsion and steering of a track trencher 30 when operating in a transport mode is generally controlled by manipulating the left and right track levers 64 and 66 which respectively control actuation of the left and right track drives 34 and 32. Moving the right track lever 66 forward, for example, generally causes the right track drive 32 to operate in a forward direction and, depending on the relative velocity of the left track drive 34, steers the track trencher 30 to move in either a left or right direction. Reversing the right track drive 32 is generally accomplished by pulling the right track lever 66 backwards, thereby causing the right track drive 32 to operate in a reverse direction. Propulsion of the left track drive 34 is accomplished in substantially the same manner as that previously described with regard to the right track drive 32. Thus, both propulsion and steering are generally controlled by the track levers 64 and 66 of a track trencher 30. Alternatively, the main user interface 101 may be configured to provide for independent steering and propulsion of the left and right track drives 34 and 32, respectively.

It is often desirable to maintain the engine 36 at a constant, optimum output level during excavation which, in turn, allows the attachment 46 to operate at an optimum excavating output level. A prior art control panel typically includes a plurality of controls and switches, including a speed range switch, RPM knob, steering trim knob, and propel trim knob, all of which must typically be adjusted during normal trenching operation to maintain the engine at the desired engine output level when encountering variable attachment 46 loading, and to steer the track trencher 30 in a desired direction. Additionally, a pair of right and left pump potentiometers typically require adjustment and readjustment to equilibrate the operational characteristics of the left and right pumps 38 and 40.

A significant disadvantage of a conventional track trencher control panel concerns a requirement that the operator must generally react quickly to changes in engine 36 loading, typically by first determining the appropriate switch to adjust and then the degree of switch adjustment. Typically, minor propulsion modifications are made by adjusting the propel trim knob. Moderate changes to the propulsion level of the track trencher 30 are generally effected by adjusting the RPM knob. A major modification to the propulsion level of the track trencher 30 is typically accomplished by switching the speed range switch from a high setting to either a medium or low setting, and once again adjusting the propel trim knob and RPM knob in order to avoid stalling out the engine 36.

The novel data acquisition and control system and process obviates the requirement of continuous manual adjustment and readjustment of a plurality of control switches, knobs, and levers. Instead, an intelligent excavation control unit (ECU) is employed to continuously monitor a network of sensors that transduce various excavator functions into electrical signals, and processes these and other electrical signals to optimize the steering and excavating performance of the excavator, with only minimal intervention by an excavator operator. An enhanced user-interface communicates pertinent excavator performance information, as well as geological and geographical position data, to an operator preferably over a display, such as a liquid crystal display or a cathode ray tube display, for example. A keyboard and other levers and switches are provided on the user-interface to communicate with the data acquisition and control system, and control the operation of the excavator.

DATA ACQUISITION AND CONTROL SYSTEM

Figure 4:
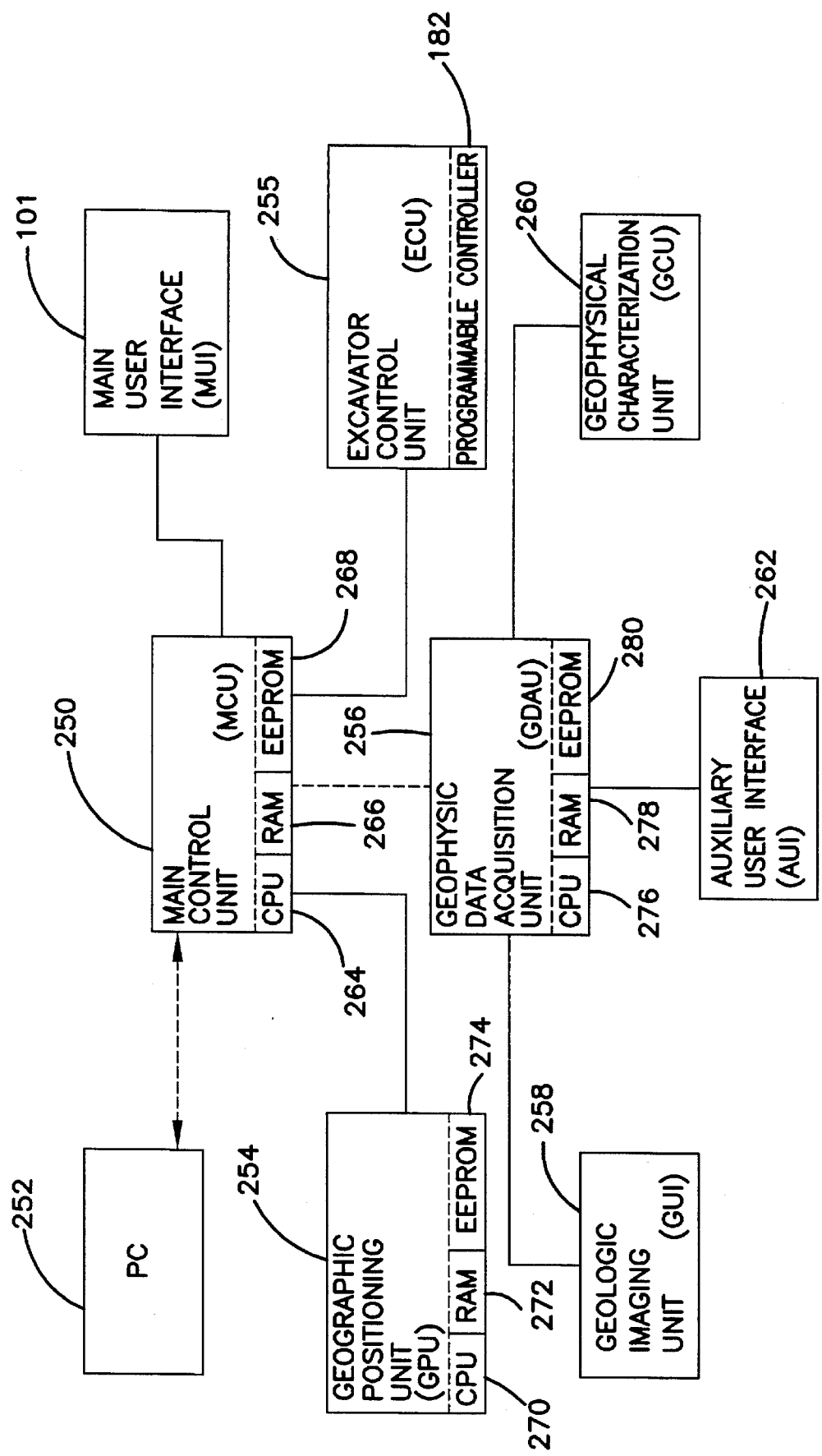
FIG. 4 is a system block diagram of a main control unit (MCU) of a novel excavator data acquisition and control system.

Turning now to FIG. 4, there is illustrated a novel data acquisition and control system shown in system block diagram form. In broad and general terms, the system shown in FIG. 4 significantly enhances the operation of an excavator by the acquisition of geological, geophysical, and position information regarding a particular excavation site, and by employing this information to enhance excavation efficiency. The acquisition of such pertinent excavation site data substantially reduces the risk involved in estimating the cost and scheduling of a particular excavation project. Real-time acquisition of geographical position data provides for precision mapping of an excavated area to accurately identify the location and depth of, for example, buried pipelines and utility conduits installed at the excavation site. These and other significant advantages and features are provided by the novel excavator data acquisition and control system and process as discussed in greater detail hereinbelow.

Referring to FIG. 4 in greater detail, the primary processing component of the novel data acquisition and control system is a main control unit (MCU) 250, which preferably includes a central processing unit (CPU) 264, Random-Access-Memory (RAM) 266, and non-volatile memory 286, such as Electrically Erasable Programmable Read-Only-Memory (EEPROM). The MCU 250 preferably includes appropriate input and output ports to communicate with a number of other sub-systems that acquire various types of data, process such data, and interface with the control system of an excavator to moderate and optimize the excavation process. A main user interface (MUI) 101 is preferably situated in proximity to an operator seat mounted to the excavator, and provides a means for communicating with the main control unit 250. An excavator control unit (ECU) 255 communicates with the main control unit 250 and is responsive to operator inputs received from the main user interface 101 to cooperatively control the operation of the excavator. A computer or programmable controller 182 is preferably incorporated as a component of the excavator control unit 255 to control and moderate excavator function.

The movement and direction of an excavator is preferably monitored and, if desired, moderated by a geographic positioning unit (GPU) 254. The geographic positioning unit 254 preferably includes a mobile transponder mounted to the excavator and one or more reference transponders. Position reference signals produced by the reference transponders are processed by a CPU 270 of the geographic positioning unit 254 into geographic position data, such as latitude, longitude, and elevation data, and displacement data from one or more reference locations, for example.

An important component of the novel data acquisition and control system concerns a geophysical data acquisition unit (GDAU) 256, which acquires various types of geological and geophysical data for a particular excavation site. In one embodiment, the geophysical data acquisition unit 256 may be decoupled from the main control unit 250 to provide for initial surveying of a predetermined excavation site. After performing the initial survey, the data acquired by the geophysical data acquisition unit 256 is preferably downloaded into the RAM 266 or EEPROM 268 of the main control unit 250. Alternatively, the geophysical data acquisition unit 256 is preferably coupled to the excavator and directly to the main control unit 250 to provide real-time acquisition of geological, geophysical, and position data during excavation. In yet another embodiment, initial surveying of an excavation site provides for the acquisition of pertinent geological, geophysical, and position data which is downloaded to the main control unit 250 upon completion of the initial survey. An onboard geophysical data acquisition unit 256, which preferably includes the components used in the initial survey, provides for real-time data acquisition which may be used in conjunction with the data acquired from the initial survey to optimize excavator production performance. The geophysical data acquisition unit 256 preferably includes a CPU 276, RAM 278, and EEPROM 280.

Among the various types of data acquired by the geophysical data acquisition unit 256, data pertaining to the specific geology at the excavation site, in addition to the physical characteristics of such geology, are of particular importance when optimizing the production performance of an excavator, and when estimating the cost and resource allocation of a particular excavation project. A geologic imaging unit (GIU) 258 is preferably coupled to the geophysical data acquisition unit 256 to provide information concerning the particular geology associated with an excavation site. Various geophysical characteristics associated with a particular geology at the excavation site are preferably determined by a geophysical characterization unit (GCU) 260. An auxiliary user interface (AUI) 262 is preferably coupled to the geophysical data acquisition unit 256 to provide local viewing of acquired data and images, and to provide a means for an operator to communicate with the geophysical data acquisition unit 256. The auxiliary user interface 262 is particularly useful in connection with an embodiment in which the geophysical data acquisition unit 256 is decoupled from the main control unit 250 to perform an initial survey of an excavation site. It is noted that RS-232 communication lines provide sufficient bandwidth for effecting communication between the electronic units and instruments of the novel data acquisition and control system.

GEOPHYSICAL DATA ACQUISITION UNIT (GDAU)

Figure 5:
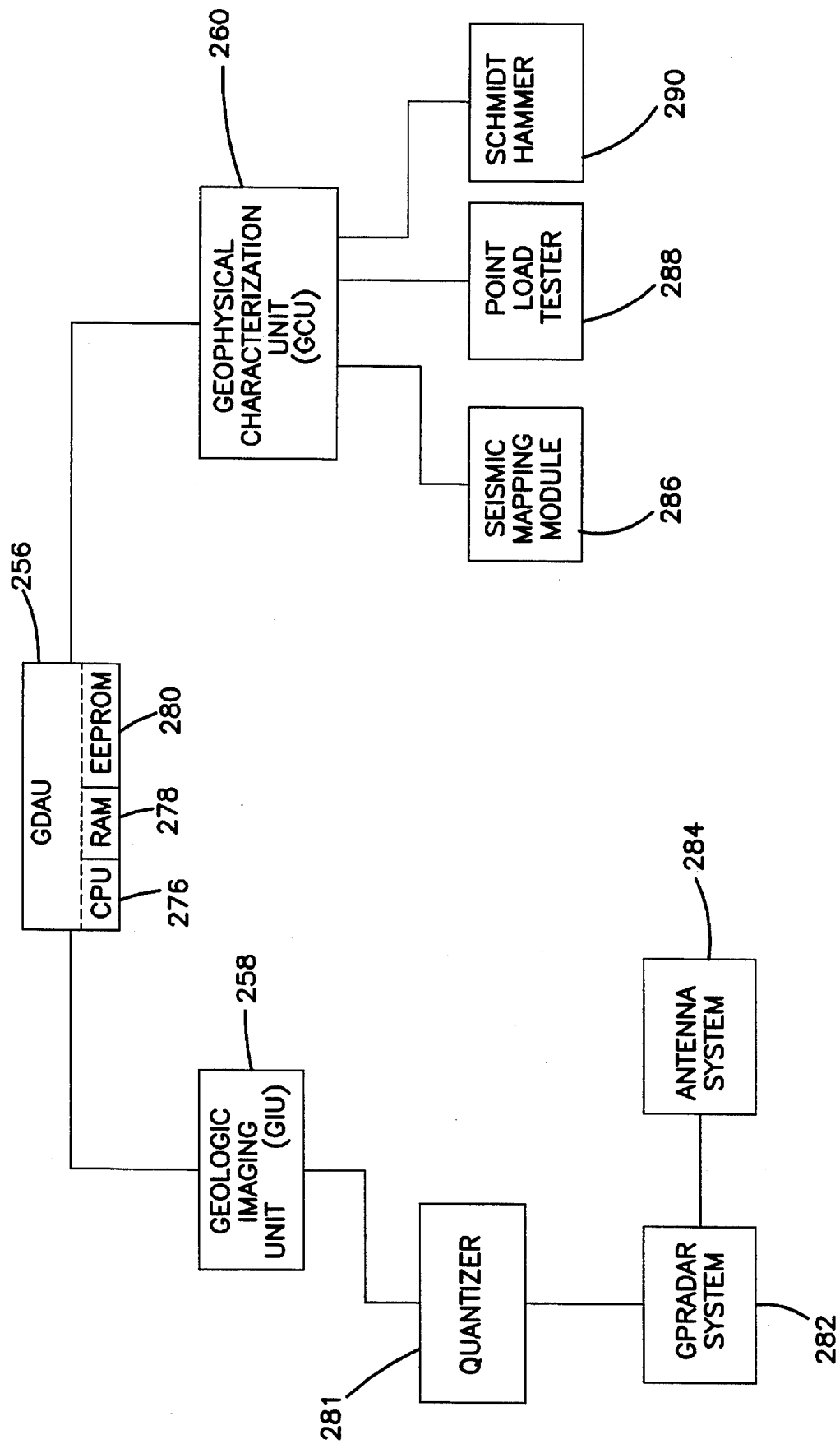
FIG. 5 is a system block diagram of a geologic data acquisition unit (GDAU) of a novel excavator data acquisition and control system.

As shown in FIG. 5, the geophysical data acquisition unit 256 preferably includes a geologic imaging unit 258 and a geophysical characterization unit 260. The geophysical characterization unit 260 preferably includes a number of geophysical instruments which provide a physical characterization of the geology for a particular excavation site. A seismic mapping module 286 includes an electronic device consisting of multiple geophysical pressure sensors. A network of these sensors are arranged in a specific orientation with respect to the excavator, and are situated so as to make direct contact with the ground. The network of sensors measures ground pressure waves produced below the excavator and in the trench walls produced by the excavator. Analysis of ground pressure waves received by the network of sensors provides a basis for determining the physical characteristics of the subsurface at the excavation site. This data is preferably processed by the CPU 276 of the geophysical data acquisition unit 256 or, alternatively, by the CPU 264 of the main control unit 250.

A point load tester 288 may be employed to determine the geophysical characteristics of the subsurface at the excavation site. The point load tester 288 preferably employs a plurality conical bits for the loading points which, in turn, are brought into contact with the ground to test the degree to which a particular subsurface can resist a calibrated level of loading. The data acquired by the point load tester 288 provides information corresponding to the geophysical mechanics of the soil under test. This data may also be transmitted to the geophysical data acquisition unit 256 for storage in the RAM 278 or EEPROM 280.

The geophysical characterization unit 260 preferably includes a Schmidt hammer 290, which is a geophysical instrument that measures the rebound hardness characteristics of a sampled subsurface geology. Other geophysical instruments may also be employed to measure the relative energy absorption characteristics of a rock mass, abrasivity, rock volume, rock quality, and other physical characteristics that together provide information regarding the relative difficulty associated with excavating a given geology. The data acquired by the Schmidt hammer 290 is also preferably stored in the RAM 278 or EEPROM 280 of the geophysical data acquisition unit 256.

The geologic imaging unit 258 preferably includes a ground penetrating radar system (GPRadar) 282 and an antenna system 284. The GPRadar system 282 cooperates with the antenna system 284 to transmit source electromagnetic signals into the subsurface of an excavation site. The source electromagnetic signals penetrate the subsurface and are reflected back to the antenna system 284. The reflected source electromagnetic signals received by the antenna system 284 are amplified and conditioned by the GPRadar system 282. In one embodiment, analog reflected source electromagnetic signals processed by the GPRadar system 282 are preferably digitized and quantized by a quantizer 281. In another embodiment, a digitizing GPRadar system 282 performs analog-to-digital conversion of the reflected source electromagnetic signals. The digitized radar data acquired by the geologic imaging unit 258 is preferably stored in RAM 278 or non-volatile EEPROM 280 memory in the geophysical data acquisition unit 256.

Figure 6:
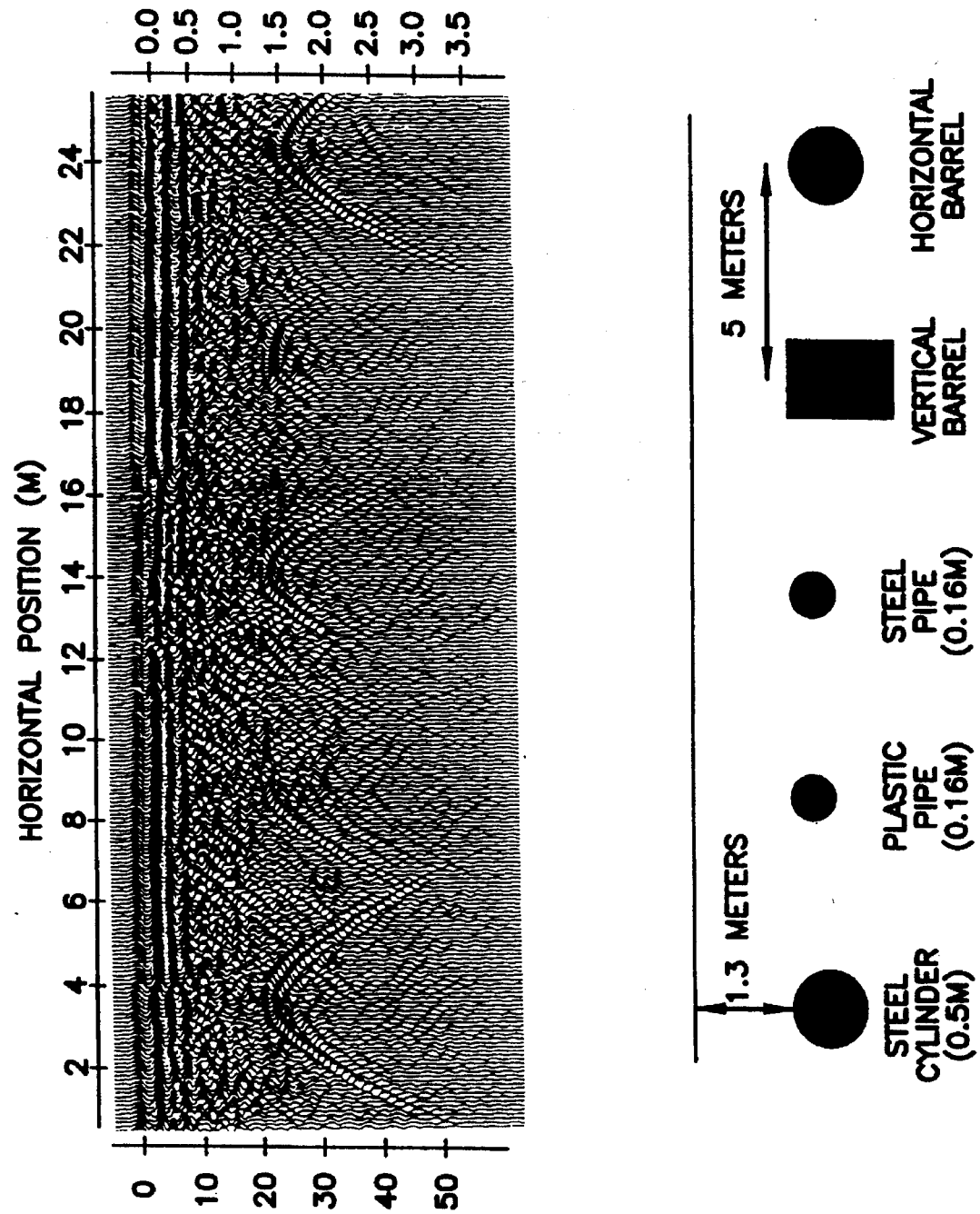
FIG. 6 is plot of reflected source electromagnetic signals received by a ground penetrating radar system using a conventional single-axis antenna system.

Referring now to FIG. 6, there is illustrated a visual illustration of typical geologic imaging data acquired from a GPRadar System 282 employing a conventional single-axis antenna system 284. In FIG. 6, there is plotted GPRadar system 282 data acquired over a test site having five different man-made hazards buried at a depth of approximately 1.3 meters in sandy soil with a water table located at a depth of approximately four to five meters. It is noted that the data illustrated in FIG. 6 is representative of data typically obtainable by use of a PulseEKKO 1000 system manufactured by Sensors and Software, Inc. using conventional single-axis 450 MHz center frequency antennas. Other GPRadar systems 282 which may be suitable for this application include SIR System-2 and System-10A manufactured by Geophysical Survey Systems, Inc. and model 1000B STEPPED-FM Ground Penetrating Radar manufactured by GeoRadar, Inc.

Each of the buried hazards illustrated in FIG. 6 has associated with it a characteristic hyperbolic time-position curve. The apex of the characteristic hyperbolic curve provides an indication of both the position and the depth of a buried hazard. It can be seen from the graph of FIG. 6 that each of the buried hazards is located approximately 1.3 meters below the ground surface, with each of the hazards being separated from adjacent hazards by a horizontal distance of approximately five meters. The GPRadar System 282 data illustrated in FIG. 6 represents geological imaging data acquired using a conventional single-axis antenna system and, as such, only provides a two-dimensional representation of the subsurface being surveyed. As will be discussed in greater detail hereinbelow, a novel antenna system 284 comprising multiple antennas arranged in an orthogonal orientation provides for an enhanced three-dimensional view of the subsurface geology associated with a particular excavation site.

GEOGRAPHIC POSITIONING UNIT (GPU)

Figure 7:
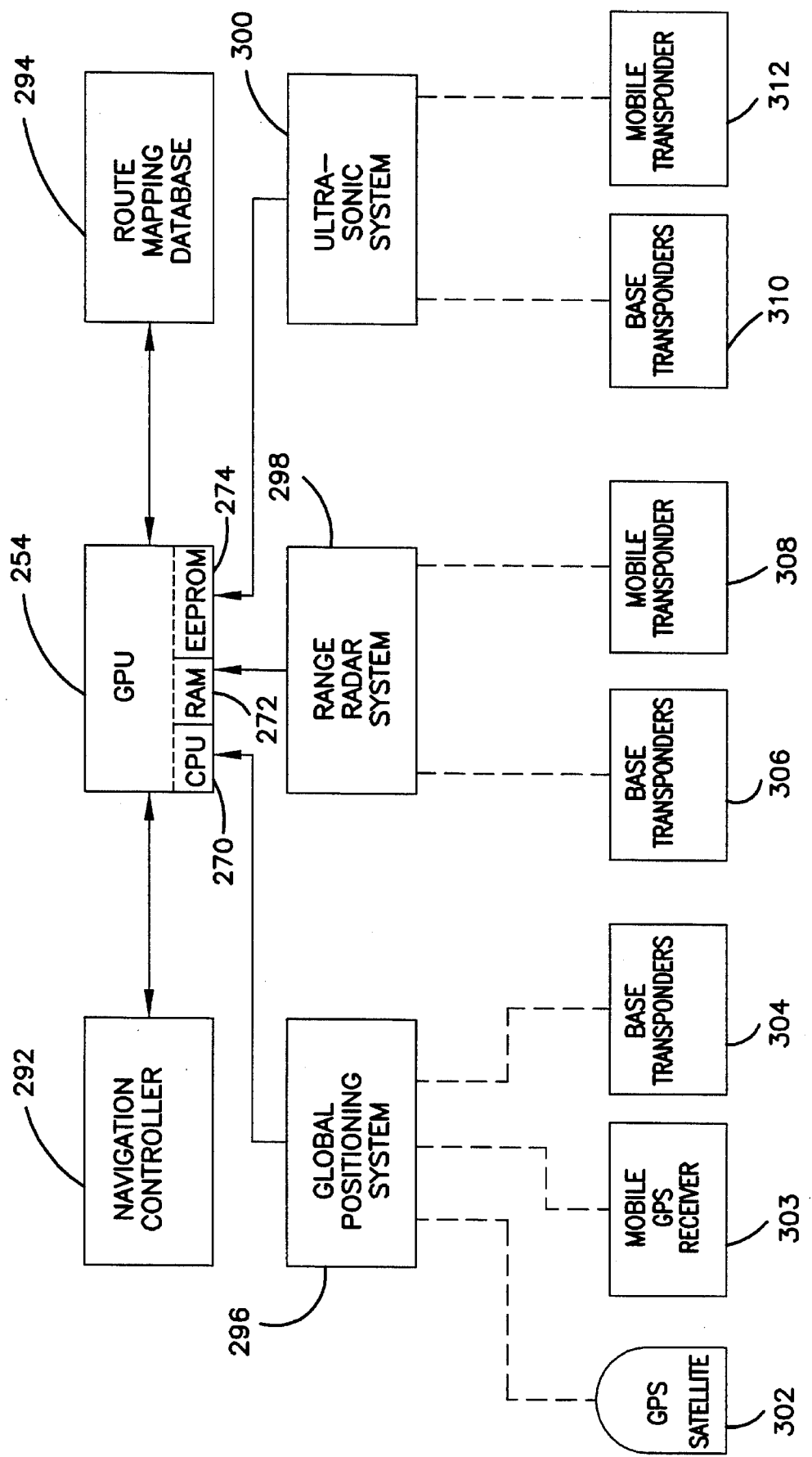
FIG. 7 is a system block diagram of a geographic positioning unit (GPU) of a novel excavator data acquisition and control system.

Turning now to FIG. 7, there is illustrated in greater detail a geographic positioning unit 254 that provides geographic position information regarding the position, movement, and direction of an excavator over an excavation site. In one embodiment, the geographic positioning unit 254 communicates with one or more external reference signal sources to determine information regarding the position of an excavator relative to one or more known reference locations. The relative movement of an excavator over a specified excavation route is preferably determined by the CPU 270 of the geographic positioning unit 254, and stored as position data in RAM 272 or EEPROM 274.

In another embodiment, geographic position data for a predetermined excavation route is preferably acquired prior to excavating the route. This position data may be uploaded into a navigation controller 292 which cooperates with the main control unit 250 and the excavator control unit 255 to provide autopilot-like control and maneuvering of the excavator over the predetermined excavation route. In yet another embodiment, position data acquired by the geographic positioning unit 254 is preferably communicated to a route mapping database 294 which stores the position data for a given excavation site, such as a grid of city streets or a golf course under which various utility, communication, plumbing, and other conduits are buried. The data stored in the route mapping database 294 may be subsequently used to produce a survey map that accurately specifies the location and depth of various utility conduits buried in a specified excavation area.

In one embodiment, a global positioning system (GPS) 296 is employed to provide position data for the geographic positioning unit 254. In accordance with a U.S. Government project to deploy twenty-four communication satellites in three sets of orbits, termed the Global Positioning System (GPS) or NAVSTAR, various signals transmitted from one or more GPS satellites may be used indirectly for purposes of determining positional displacement of an excavator relative to one or more known reference locations. It is generally understood that the U.S. Government GPS satellite system provides for a reserved or protected band and a civilian band. Generally, the protected band provides for high-precision positioning to an accuracy of approximately one to ten feet. The protected band, however, is generally reserved exclusively for military and governmental surveillance purposes, and is modulated in such a manner as to render it virtually useless for civilian applications. The civilian band is modulated so as to significantly decrease its usefulness in high-accuracy applications. In most applications, positional accuracies of approximately one hundred to three hundred feet are typical using the civilian band.

The civilian GPS band, however, can be used indirectly in relatively high-accuracy applications by using one or more civilian GPS signals in combination with one or more ground-based reference signal sources. By employing various known signal processing techniques, generally referred to as differential global positioning system (DGPS) signal processing techniques, positional accuracies on the order of one foot or less are achievable. As shown in FIG. 7, the global positioning system 296 utilizes a signal produced by at least one GPS satellite 302 in cooperation with signals produced by at least two base transponders 304, although use of one base transponder 304 may be satisfactory in some applications. Various known methods for exploiting differential global positioning signals using one or more base transponders 304, together with a GPS satellite signal 302 and a mobile GPS receiver 303 mounted to the excavator, may be employed to accurately resolve excavator movement relative to base transponder 304 reference locations using a GPS satellite signal source.

In another embodiment, a ground-based positioning system may be employed using a range radar system 298. The range radar system 298 preferably includes a plurality of base radio frequency (RF) transponders 306 and a mobile transponder 308 mounted to the excavator. The base transponders 306 emit RF signals which are received by the mobile transponder 308. The mobile transponder 308 preferably includes a computer that calculates the range of the mobile transponder 308 relative to each of the base transponders 306 through various known radar techniques, and then calculates its position relative to all base transponders 306. The position data acquired by the range radar system 298 is preferably stored in the RAM 272 or EEPROM 274 of the geographic positioning unit 254.

An ultra-sonic positioning system 300, in another embodiment, may be employed together with base transponders 310 and a mobile transponder 312 mounted to the excavator. The base transponder 310 emits signals having a known clock timebase which are received by the mobile transponder 312. The mobile transponder 312 preferably includes a computer which calculates the range of the mobile transponder 312 relative to each of the base transponders 310 by referencing the clock speed of the source ultrasonic waves. The computer of the mobile transponder 312 also calculates the position of the excavator relative to all of the base transponders 310. It is to be understood that various other known ground-based and satellite-based positioning systems may be employed to accurately determine excavator movement along a predetermined excavation route.

EXCAVATOR CONTROL UNIT (ECU)

Figure 8:
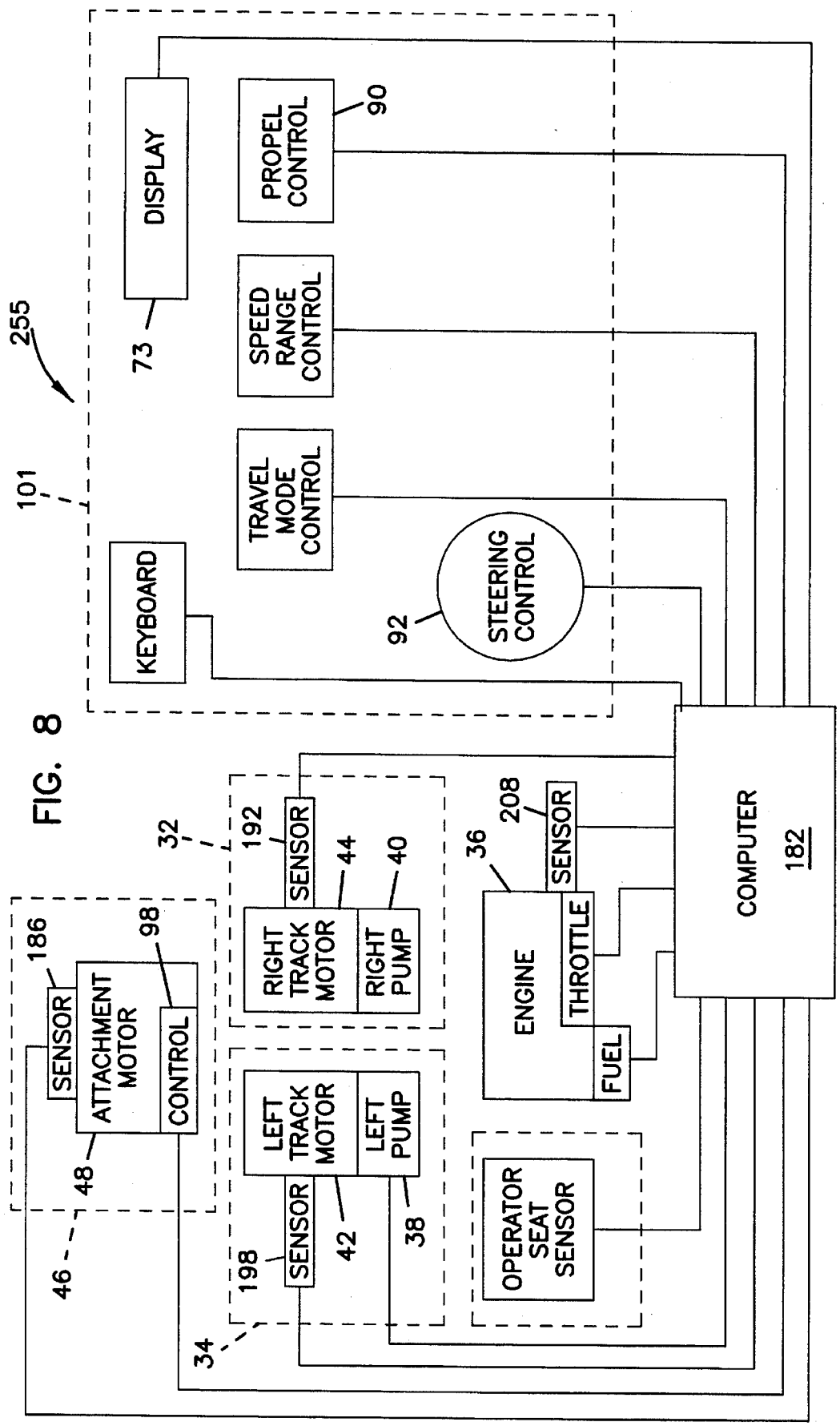
FIG. 8 is a system block diagram of an excavator control unit (ECU) of a novel excavator data acquisition and control system.

Referring now to FIG. 8, there is illustrated a system block diagram of an excavator control unit (ECU) 255 which communicates with the main control unit (MCU) 250 to coordinate the operation of an excavator. In accordance with an embodiment of the track trencher excavator 30 illustrated in FIGS. 1 and 2, the left track drive 34 typically comprises a left track pump 38 coupled to a left track motor 42, and the right track drive 32 typically comprises a right track pump 40 coupled to a right track motor 44. Left and right track motor sensors 198 and 192 are preferably coupled to the left and right track motors 42 and 44, respectively. The left and right track pumps 38 and 40, deriving power from the engine 36, preferably regulate oil flow to the left and right track motors 42 and 44 which, in turn, provide propulsion for the left and right track drives 34 and 32. The excavation attachment 46 preferably comprises an attachment motor 48 and an attachment control 98, with the attachment 46 preferably deriving power from the engine 36. A sensor 186 is preferably coupled to the attachment motor 46. Actuation of the left track motor 42, right track motor 44, and attachment motor 48 is monitored by sensors 198, 192, and 186 respectively. The output signals produced by the sensors 198, 192, and 186 are communicated to the computer 182.

In response to steering and propel control signals respectively produced by the steering control 92 and propel control 90, the computer 182 communicates control signals, typically in the form of control current, to the left and right track pumps 38 and 40 which, in turn, regulate the speed at which the left and right track motors 42 and 44 operate. The left and right track motor sensors 198 and 192 communicate track motor sense signals to the computer 182 indicative of the actual speed of the left and right track motors 42 and 44. Similarly, an engine sensor 208, coupled to the engine 36, provides an engine sense signal to the computer 182, thus completing a closed-loop control system for the tractor drive portion 45 of a track trencher 30. Those skilled in the art will recognize that various known computer configurations will provide a suitable platform for effectuating propulsion and steering changes of a track trencher 30 in response to the propel and steering signals produced by the propel and steering controls 90 and 92.

The excavation attachment 46 portion of a track trencher 30 includes an attachment motor 48, attachment control 98, and at least one attachment sensor 186. The attachment motor 48 preferably responds to instructions communicated to the attachment control 98 from the computer 182. The actual output of the attachment motor 48 is monitored by the attachment sensor 186, which produces an attachment sense signal received by the computer 182.

In one embodiment, the left and right track motor sensors 198 and 192 are of a type generally referred to in the art as magnetic pulse pickups, or PPUs. The PPUs 198 and 192 transduce track motor rotation into a continuous series of pulse signals, wherein the pulse train preferably represents the frequency of track motor rotation as measured in revolutions-per-minute. When a transport mode of travel is selected, the propel control 90 preferably produces a transport propel control signal which is representative of a target velocity for the left and right track motors 42 and 44, typically measured in revolutions-per-minute. Conversion of the transport propel signal into a target track motor velocity may be accomplished by the propel control 90 itself or, preferably, by the computer 182. The computer 182 typically compares the left and right track motor sense signals respectively produced by the left and right PPU sensors 198 and 192 to the target track motor propulsion level represented by the transport propel signal. The computer 182 communicates the appropriate pump control signals to the left and right track pumps 38 and 40 in response to the outcome of the comparison to compensate for any deviation between the actual and target track motor propulsion levels.

A display 73 is coupled to the computer 182 or, alternatively, to the main control unit 250, and preferably communicates messages indicative of operating status, diagnostic, calibration, fault, safety, and other related information to an operator. The display 73 provides quick, accurate, and easy-to-understand information to an operator by virtue of the interpretive power of the computer 182 which acquires and processes data from a plurality of track trencher sensors, and various geological and geophysical instruments. Geologic imaging data and related geophysical information, for example, is visually displayed on the display 73. Further, information regarding the position of the excavator as it traverses along a predetermined excavation route, as well as signal quality information received from the geographic positioning unit 254, is displayed on the display 73. A keyboard 75 is also provided on the main user interface 101 to permit an operator to communicate with the excavator control unit 255 and the main control unit 250.

MAIN CONTROL UNIT (MCU)

Figure 9:
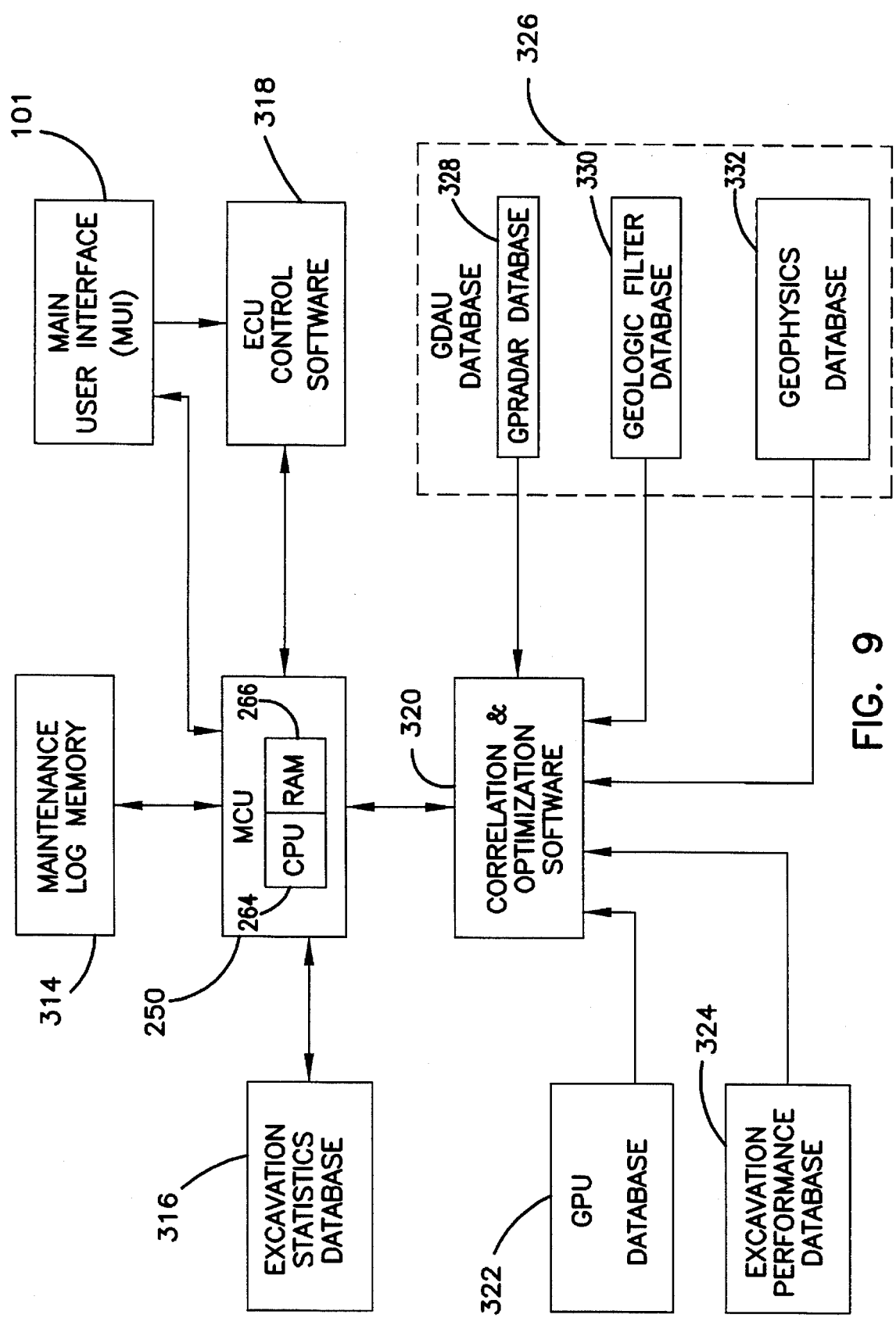
FIG. 9 is a block diagram of various databases and software accessed and processed by the main control unit (MCU)

Turning now to FIG. 9, there is illustrated a block diagram of various databases and software that are utilized by the main control unit (MCU) 250 when accessing and processing geological, geophysical, position, and operational data associated with surveying and excavating a selected excavation site. The data acquired by the geophysic data acquisition unit 256, for example, is preferably stored in a database 326, which includes a GPRadar database 328, a geologic filter database 330, and a geophysics database 332. The GPRadar system 282 data, as previously discussed, is preferably digitized and stored in the GPRadar database 328 in a suitable digital format appropriate for correlation to data stored in other system databases. A geologic filter database 330, as will be discussed in greater detail hereinbelow, includes filtering data produced by correlating GPRadar data to corresponding excavator production data stored in the excavation performance database 324. Correlation and optimization software 320 performs the correlation of GPRadar data to actual excavator production data to develop an array of adjustable geologic digital filters that can be effectively overlaid with real-time acquired geologic image data to exclude or "filter out" verified geology data, thus leaving unverified images representative of one or more buried hazards. By way of further illustration, a particular type of soil produces a characteristic return radar image which can be correlated with excavator production data acquired by the excavator control unit 255. Excavating through granite, for example, produces a characteristic return radar image that can be correlated to various excavator operation parameters, such as excavation attachment motor 48 speed, engine 36 loading, and left or right track motor 42 and 44 velocity changes.

An "excavation difficulty" parameter or set of parameters are preferably computed based on the excavator operating parameters. The "excavation difficulty" parameters are then associated with the characteristic reflected radar image data corresponding to a particular geology, such as granite, for example. An array of "excavation difficulty" filter parameters and associated reflected radar image data values are preferably developed for a wide range of soil and rock, and stored in the geologic filter database 330.

An excavation statistics database 316 preferably receives data files from the correlation and optimization software 320 and compiles statistical data to reflect actual excavator production performance relative to specific geology, maintenance, and equipment variables. In one embodiment, GPRadar data and geophysical data is acquired by the geophysic data acquisition unit 256 during an initial survey of a predetermined excavation route. This data is preferably uploaded to the excavation statistics database 316 prior to excavating the predetermined route. The data stored in the excavation statistics database 316 can be viewed as a production estimate in the sample geology based on past excavator production performance.

The main control unit 250 also executes ECU control software 318 which receives data files from the correlation and optimization software 320 and input commands received from the main user interface 101. The ECU control software 318 compiles a current operation standard for operating the excavator over the course of the predetermined excavation route. If input data received from the main user interface 101 causes a modification in the operation standard, the ECU control software 318 computes modified excavator operational instructions which are transmitted to the main control unit 250 and the excavator control unit 255 which, in turn, modifies the operation of the excavator in response to the modified operation standard.

A maintenance log memory 314 preferably includes non-volatile memory for storing various types of excavator maintenance information. An elapsed time indicator is preferably included in the maintenance log memory 314 which indicates the total elapsed operating time of the excavator. At predefined operating time values, which are preferably stored in the maintenance log memory 314, the excavator operator is prompted by the main user interface 101 that scheduled service is required. Verification of scheduled service, the type of service, the date of service, and other related information is preferably input through the main user interface 101 for permanent storage in the maintenance log memory 314. In one embodiment, the maintenance log memory 314 preferably includes a table of factory designated operational values and ranges of operational values associated with nominal excavator operation. Associated with each of the operational values and ranges of values is a status counter which is incremented upon each occurrence of excavator operation outside of the prescribed values or range of values. The status counter information is useful in assessing the degree to which an excavator has been operated outside factory specified operational ranges, which is particularly useful when determining the appropriateness of warranty repair work.

GEOLOGIC SURVEYING AND IMAGING

Figure 10:
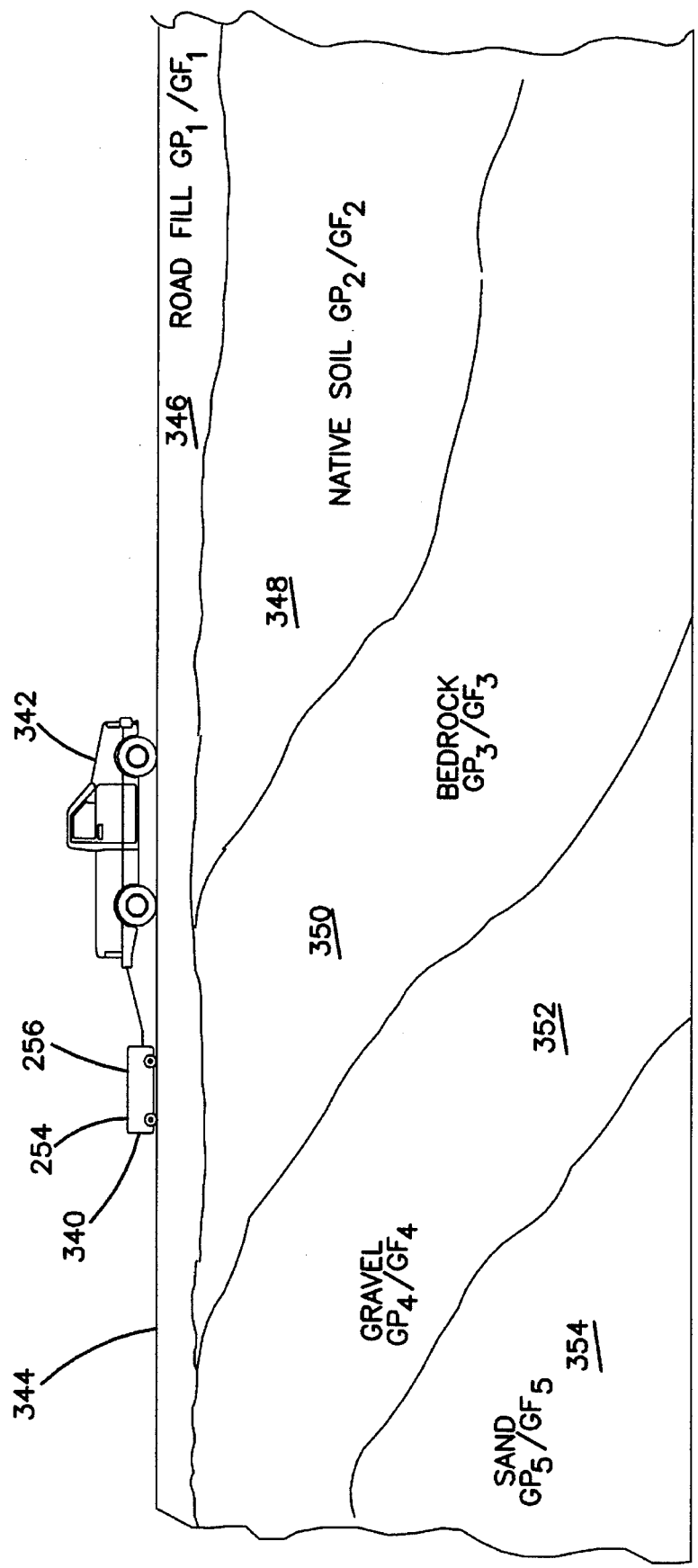
FIG. 10 is an illustration of a predetermined excavation site having a heterogenous subsurface geology.

In general operation, as shown in FIG. 10, a predetermined excavation route is preferably initially surveyed using the geographic positioning unit 254 and the geophysic data acquisition unit 256. In one embodiment, the geographic positioning unit 254 and geophysic data acquisition unit 256 are positioned in a transport cart 340 which is pulled along the predetermined excavation route by a vehicle 342. In the illustrative example shown in FIG. 10, the excavation route is a county road under which a utility conduit is to be installed. As the transport cart 340 is pulled along the roadway 344, data received from the geologic imaging unit 258 is acquired for the purpose of determining the soil properties of the subsurface below the roadway 344. Concurrently, geographic position data is acquired by the geographic positioning unit 254 as the vehicle 342 and transport cart 340 traverse the roadway 344. As such, specific geologic data obtained from the geologic imaging unit 258 may be correlated to specific geographic locations along the roadway 344.

The geologic imaging unit 258 preferably includes a GPRadar system 282 which is typically calibrated to penetrate to a pre-established depth associated with a desired depth of excavation. Depending on the predetermined excavation depth, various types of soil and rock may be encountered along the predetermined excavation route. As shown in FIG. 10, a layer of road fill 346, which lies immediately below the roadway 344, has associated with it a characteristic geologic profile $GP_1$ and a corresponding geologic filter profile $GF_1$ which, as previously discussed, represents a correlation between excavation production performance data to reflected radar image data for a particular soil type. As the transport cart 340 traverses the roadway 344, various types of soil and subsurface structures are detected, such as a sand layer 354, gravel 352, bedrock 350, and native soil 348, each of which has a corresponding characteristic geologic profile and geologic filter profile.

Upon completion of the initial survey, the data acquired and stored in the geophysic data acquisition unit 256 and geographic positioning unit 254 is preferably downloaded to a separate personal computer (PC) 252. The PC 252 preferably includes excavation statistics software and an associated database 316 to correlate the acquired survey data with historical excavator production performance data to produce an estimation as to expected excavator performance over the surveyed route. The performance estimates may further be used as a basis for computing the time and cost involved in excavating a particular area based on actual geological data and historical production performance data.

After completion of the initial survey, the geophysic data acquisition unit 256 is preferably coupled to the main control unit 250 on the excavator prior to initiating excavation along the surveyed route. During excavation, as previously discussed, the various databases containing geological, geophysical, position, and excavator operating performance data are processed by the main control unit 250. The main control unit 250, in cooperation with the excavator control unit 255, adjusts the operation of the excavator as it traverses and excavates along the surveyed route to optimize excavation.

Figure 11:
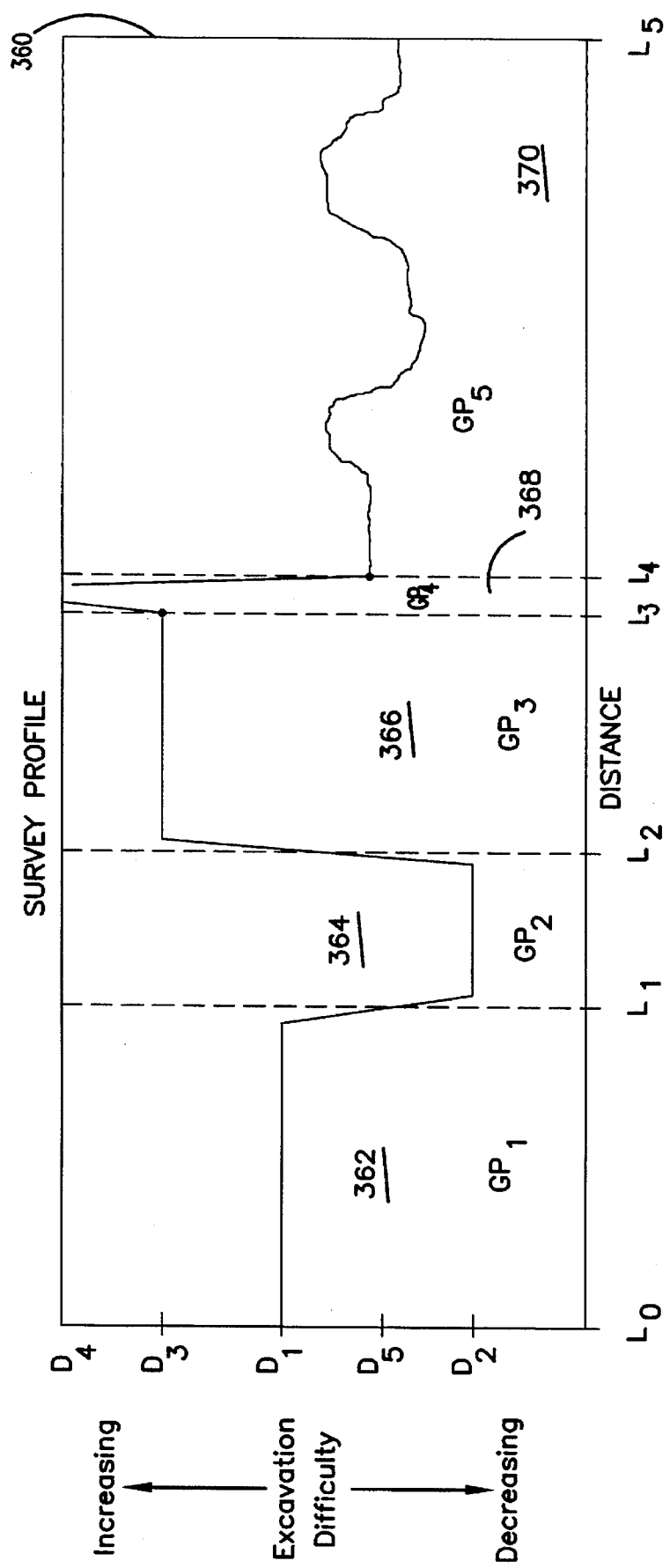
FIG. 11 is an illustration of a survey profile in chart form obtained for a predetermined excavation route using a novel geologic data acquisition unit (GDAU) and geologic positioning unit (GPU)

Referring now to FIG. 11, there is illustrated an example of a survey profile obtained by transporting the geophysic data acquisition unit 256 and geographic positioning unit 254 along a predetermined excavation route. It is noted that in this illustrative example, the length of the excavation route is defined as the distance between Location $L_0$ and Location $L_5$. A corresponding estimated excavation production profile for the predetermined excavation route is shown in FIG. 12.

Referring to FIG. 11 in greater detail, distinct changes in subsurface geological characteristics can be observed at locations $L_1$, $L_2$, $L_3$, and $L_4$, which are associated with corresponding changes in the "excavation difficulty" parameter plotted along the Y-axis of the survey profile chart. Between locations $L_0$ and $L_1$, for example, the geologic profile $GP_1$ 362 of the subsurface has associated with it a corresponding excavation difficulty parameter of $D_1$. The geologic imaging data at $L_1$ indicates a transition in the subsurface geology to soil having a geologic profile of $GP_2$ 364 and a corresponding excavation difficulty parameter of $D_2$, thus indicating a transition to relatively softer soil.

Figure 12:
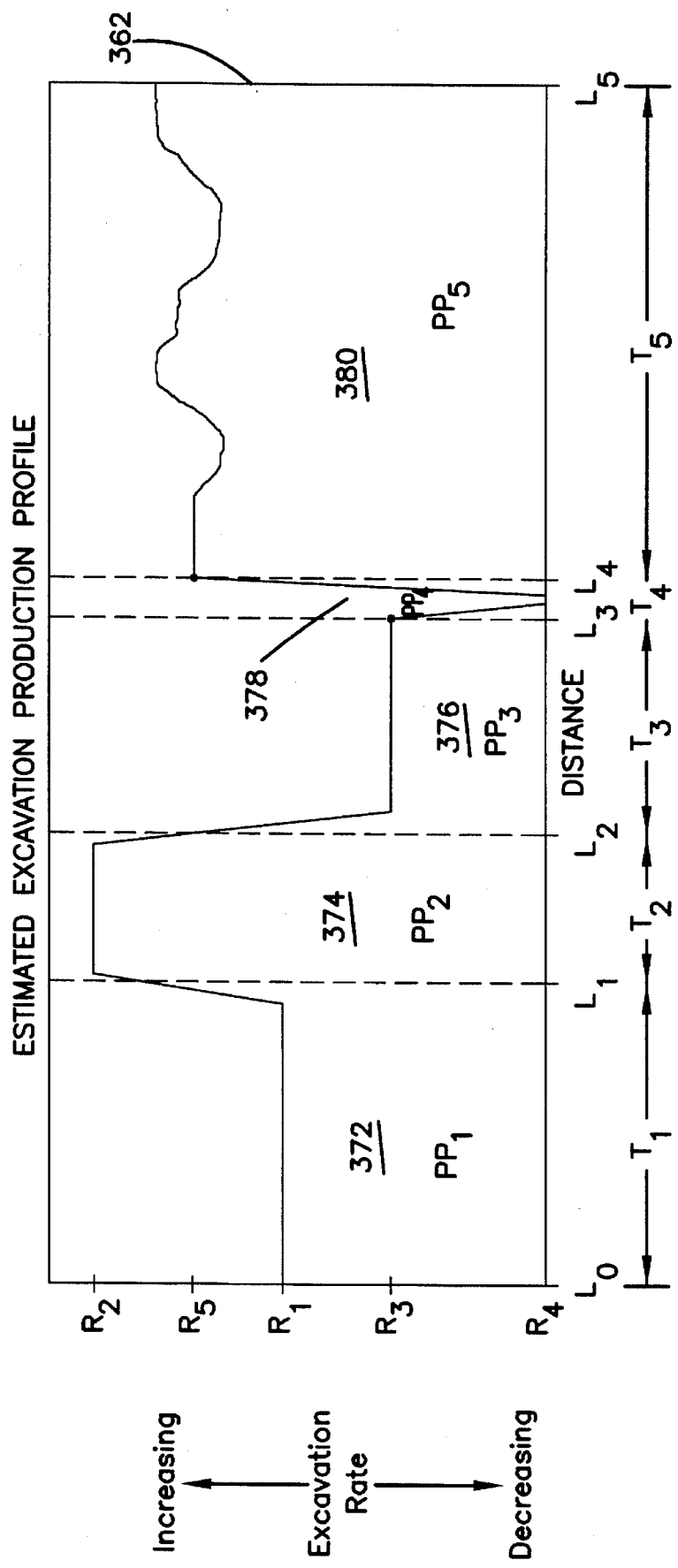
FIG. 12 is an illustration of an estimated excavation production profile in chart form corresponding to the survey profile chart of FIG. 11.

The estimated excavation production profile data shown in FIG. 12 indicates a corresponding transition from an initial production profile $PP_1$ 372 to another production profile $PP_2$ 374 at location $L_1$. It is noted that the rate of excavation is plotted along the Y-axis of the excavation production profile chart. Based on the survey profile data for the subsurface geological characteristics between locations $L_0$ and $L_2$, it can be seen that an initial excavation rate $R_1$ is estimated for the portion of the predetermined excavation route between locations $L_0$ and $L_1$, and an increased excavation rate of $R_2$ between excavation route locations $L_1$ and $L_2$ due to the lower excavation difficulty parameter $D_2$ associated with geologic profile $GP_2$ 364. It can be seen that a similar relationship exists between a particular excavation difficulty parameter and its corresponding estimated excavation rate parameter.

In general, excavation difficulty parameters of increasing magnitude are associated with corresponding excavation rate parameters of decreasing magnitude. This generalized inverse relationship reflects the practical result that excavating relatively hard soil, such as granite, results in a relatively low excavation rate, while excavating relatively soft soil, such as sand, results in relatively high excavation rates. It is noted that associated with each particular geologic profile ($GP_x$) and production profile ($PP_x$), there exists a corresponding excavation time, such as excavation time $T_1$ associated with geologic profile $GP_1$ 362 and production profile $PP_1$ 372. As such, a total estimated excavation time for a particular predetermined excavation route can be obtained by summing each of the individual excavation time parameters $T_1$ through $T_N$.

The survey profile data of FIG. 11 associated with geologic profile $GP_4$ 368 between excavation route locations $L_3$ and $L_4$ indicates a discontinuity at this location. The excavation production profile data of FIG. 12 corresponding to this portion of the predetermined excavation route indicates a corresponding discontinuity in the excavation rate estimation which is shown diverging toward zero. The data for this portion of the predetermined excavation route indicates the existence of extremely tough soil or, more likely, a man-made hazard, such as a concrete or steel pipeline, for example. Further investigation and surveying of the specific area may be warranted, which may require removal of the hazard or modification to the predetermined excavation route.

A more realistic geologic profile for a particular length of the predetermined excavation route is illustrated as geologic profile $GP_5$ 370 shown between excavation route locations $L_4$ and $L_5$. The excavation difficulty parameter for this geologic profile results in an averaged parameter of $D_5$. Accordingly, an averaged excavation rate of $R_5$ may be appropriate when excavating this portion of the predetermined route. Alternatively, the excavation rate associated with the production profile $PP_5$ 380 may be moderated by the excavator control unit 255 to optimize the excavation rate based on such fluctuations in excavation difficulty. It is understood that the ability of an excavator to respond to such fluctuations in excavation rate is generally limited by various mechanical and operational limitations.

Figure 13:
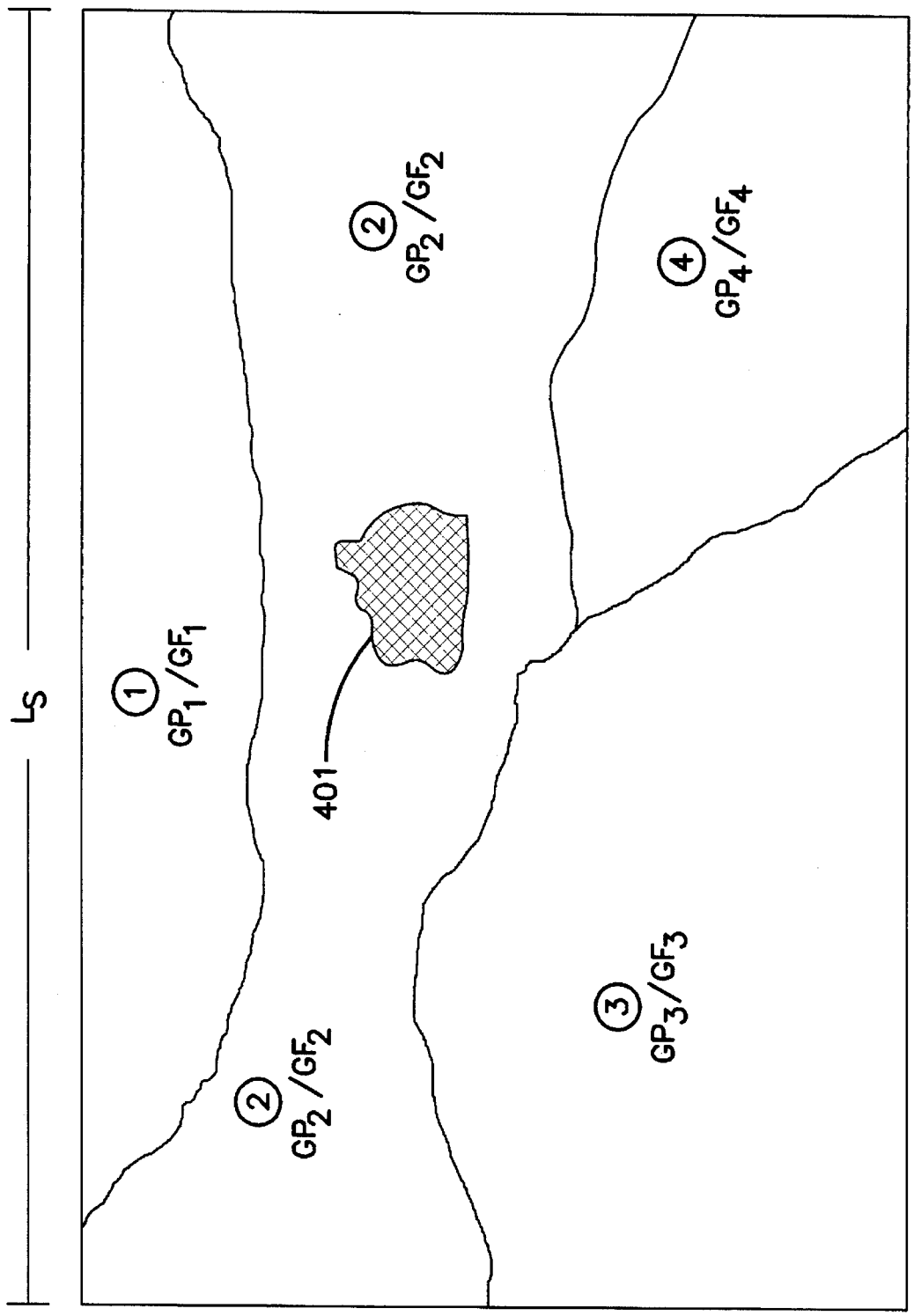
FIG. 13 is an illustration of a predetermined excavation site having a heterogenous subsurface geology and an unknown buried object.

Turning now to FIG. 13, there is illustrated a heterogeneous composition of differing soil types over a predetermined excavation route having a predefined distance of $L_S$. The soil in region 1, for example, has a geologic profile of $GP_1$ and a corresponding geologic filter profile of $GF_1$. Each of the other soil types illustrated in FIG. 13 has a corresponding geologic profile and geologic filter profile value. It is assumed that the geologic filter database 330 contains geologic filter data for each of the regions 1, 2, 3 and 4 illustrated in FIG. 13. A significant advantage of the novel hazard detection process performed by the geophysic data acquisition unit 256 concerns the ability to quickly detect the existence of an unknown buried structure 401. The correlation and optimization software 320 executed by the main control unit 250 preferably filters out known geology using a corresponding known geologic filter profile to exclude the known or verified geology data from data associated with a survey scan image. Filtering out or excluding the known or verified geology data results in imaging only unverified buried structures 401. By excluding known geological data from geologic imaging survey scan data, unknown or suspect buried structures are clearly recognizable.

Figure 14:
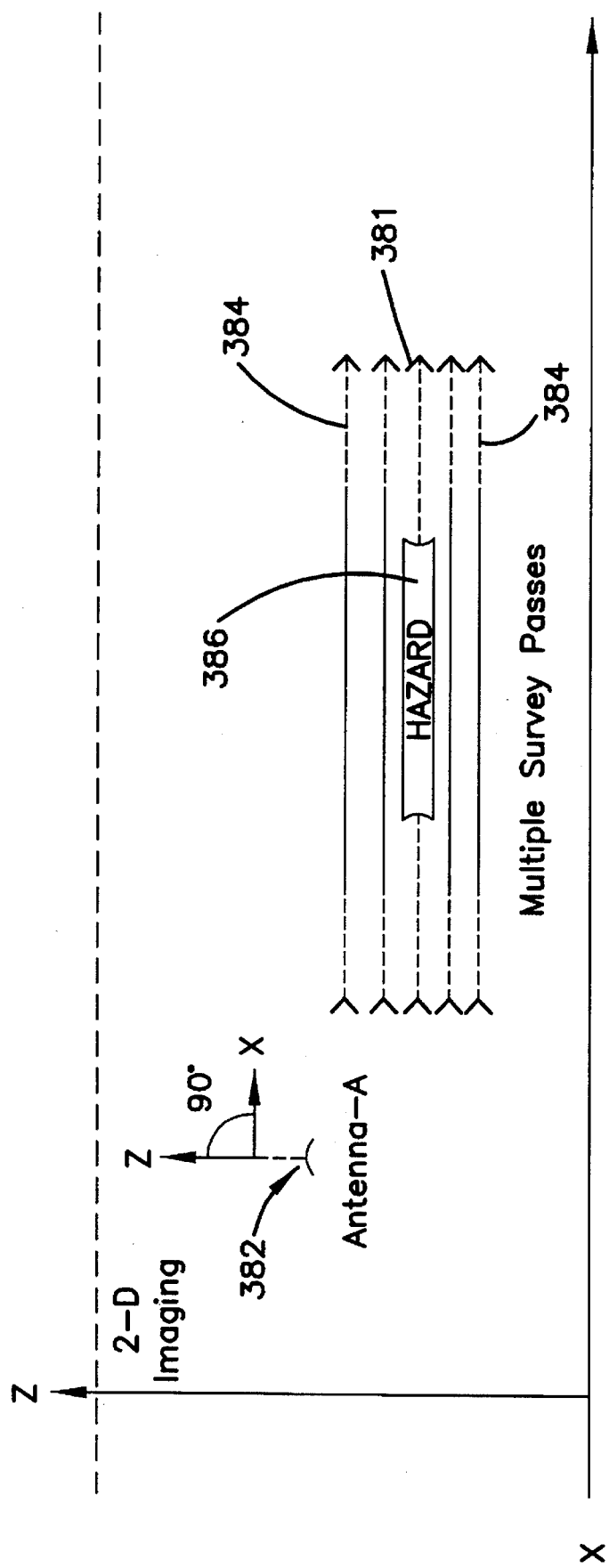
FIG. 14 is an illustration of a conventional single-axis antenna system typically used with a ground penetrating radar system for providing two-dimensional subsurface geologic imaging.

Referring now to FIG. 14, there is illustrated a conventional antenna configuration for use with a ground penetrating radar system. Generally, a single-axis antenna, such as the one illustrated as antenna-A 382 oriented along the Z-axis, is employed to perform multiple survey passes 384 when attempting to locate a potential buried hazard 386. Generally, a ground penetrating radar system has a time measurement capability which allows measuring of the time for a signal to travel from the transmitter, bounce off a target, and return to the receiver. This time function can be calibrated to the velocity of a specific subsurface condition in order to measure distance to a subsurface object or horizon. Calculations can be used to convert this time value to a distance measurement that represents the depth of the target based upon field determined values for characteristic soil properties, such a dielectric and wave velocity through a particular soil type. A simplified technique that can be used when calibrating the depth measurement capabilities of a particular ground penetrating radar system involves coring a sample target, measuring its depth, and relating it to the number of nanoseconds it takes a wave to propagate.

After the time function capability of the ground penetrating radar system provides an operator with depth information, the radar system is moved laterally in a horizontal (X) direction, thus allowing for the construction of a two-dimensional profile of a subsurface. By performing multiple survey passes in a series of parallel lines 384 over a particular site, a buried hazard 386 may be located. It can be appreciated, however, that the two-dimensional imaging capability of a conventional antenna configuration 382 can result in missing a buried hazard 386, particularly when the hazard 386 is parallel to the direction of a survey pass 384.

Figure 15:
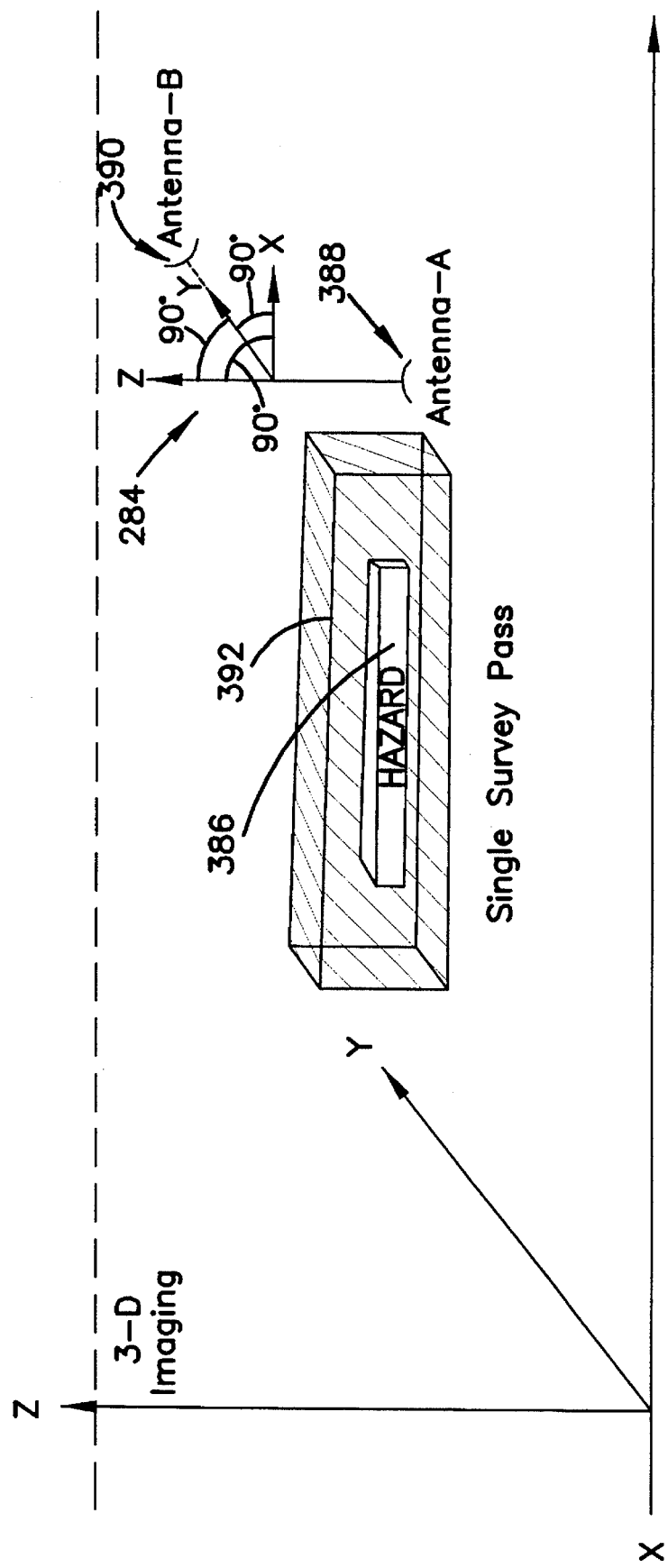
FIG. 15 is an illustration of a novel antenna system including a plurality of antennas oriented in an orthogonal relationship for use with a ground penetrating radar system to provide three-dimensional subsurface geologic imaging.

A significant advantage of a novel geologic imaging antenna configuration 284 provides for three-dimensional imaging of a subsurface as shown in FIG. 15. A pair of antennas, antenna-A 388 and antenna-B 390, are preferably employed in an orthogonal configuration to provide for three-dimensional imaging of a buried hazard 386. It is noted that the characteristic hyperbolic time-position data distribution, as shown in two-dimensional form in FIG. 6 by use of a conventional single-axis antenna, may instead be plotted as a three-dimensional hyperbolic shape that provides width, length, and breadth dimensions of a detected buried hazard 386. It is further noted that a buried hazard 386, such as a drainage pipeline, which runs parallel to the survey path 392 will immediately be detected by the three-dimensional imaging GPRadar system 282. Respective pairs of orthogonally oriented transmitting and receiving antennas are preferably employed in the antenna system 284 of the geological imaging unit 258.

EXCAVATION SITE MAPPING

Figure 16:
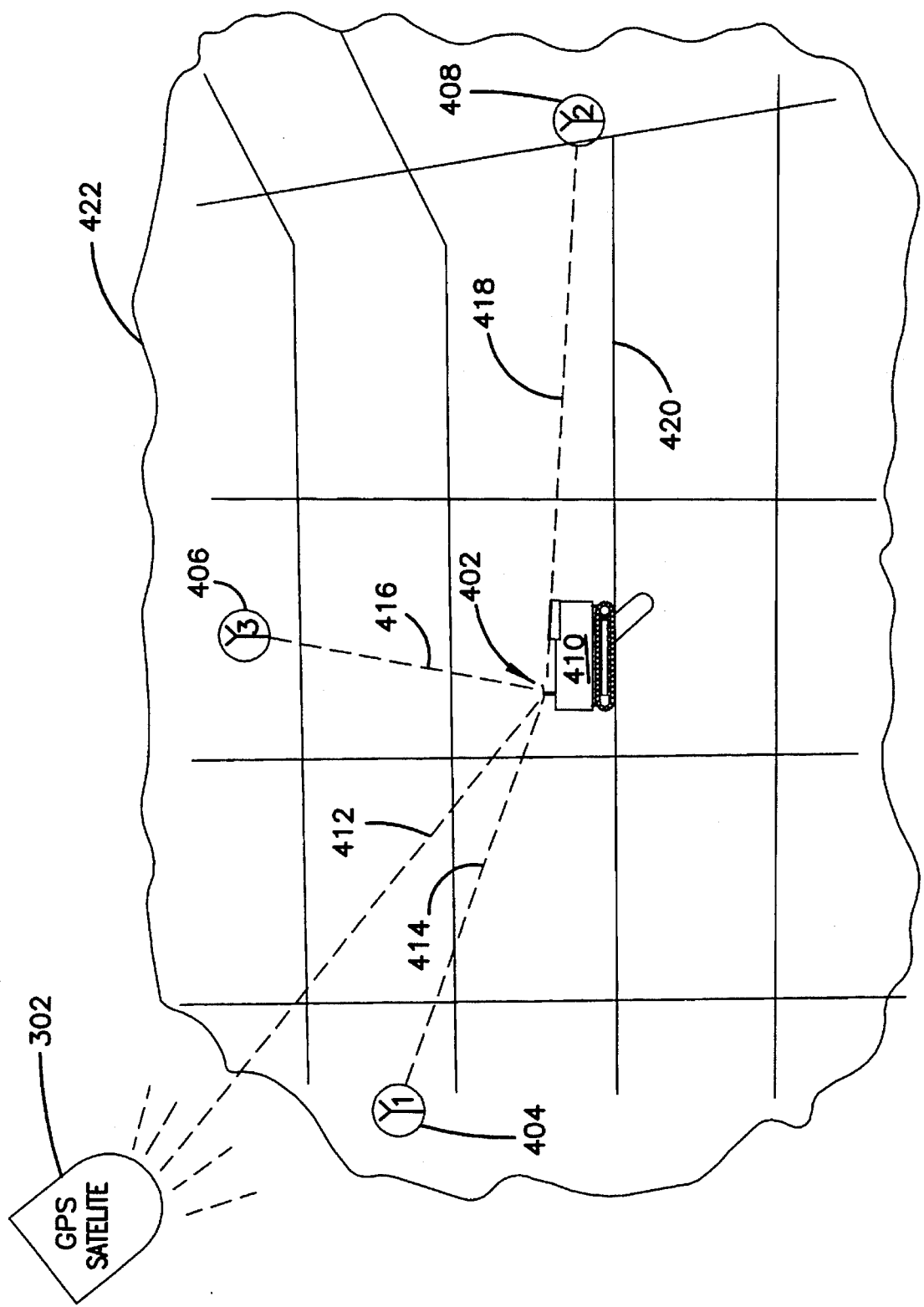
FIG. 16 is an illustration of a partial grid of city streets and an excavator equipped with a novel excavator data acquisition and control system employed to accurately map a predestined excavation site.

Turning now to FIG. 16, there is illustrated an excavator 410 performing an excavation operation along a city street 420 of a city street grid 422. An important advantage of the novel geographic positioning unit 254 of the excavator 410 concerns the ability to accurately navigate along a predetermined excavation route, such as a city street 420, and to accurately map the excavation route in a route mapping database 294 coupled to the geographic positioning unit 254. It may be desirable to initially survey a city street grid 422 for purposes of accurately establishing an excavation route for each of the applicable city streets 420 comprising the city street grid 422, for example. This data is preferably loaded into the navigation controller 292 of the geographic positioning unit 254.

As the excavator 410 progresses along the excavation route defined for each of the city streets 420, actual position data is acquired by the geographic positioning unit 254 and stored in the route mapping database 294. Any deviation from the predetermined excavation route stored in the navigation controller 292 is accurately recorded in the route mapping database 294. Upon completion of an excavation effort, the data stored in the route mapping database 294 may be downloaded to a PC 252 to construct an "as built" excavation map of the city street grid 422.

Accordingly, an accurate survey map of utility or other conduits installed along the excavation route may be constructed from the route mapping data and subsequently referenced by workers desiring to gain access to, or avoid, the buried conduits. It is to be understood that excavating one or more city streets for the purpose of installing utility conduits as shown in FIG. 16 is provided for illustrative purposes, and does not represent a limitation on the application of the geographic positioning and route mapping capability of the novel excavator data acquisition and control system.

Still referring to FIG. 16, accurate navigation and mapping of a prescribed excavation route may be accomplished by a global positioning system 296, range radar system 298 or ultrasonic positioning system 300, as discussed previously with respect to FIG. 7. An excavator data acquisition and control system utilizing a GPS 296 configuration preferably includes first and second base transponders 404 and 408 together with one or more GPS signals received from a corresponding number of GPS satellites 302. A mobile transponder 402, preferably mounted to the excavator 410, is provided for receiving the GPS satellite signal 412 and base transponder signals 414 and 418 respectively transmitted from the base transponders 404 and 408. As previously discussed, a modified form of differential GPS positioning techniques may be employed to enhance positioning accuracy to one foot or less.

In another embodiment, a ground-base range radar system 298 includes three base transponders 404, 408, and 406 and a mobile transponder 402 mounted to the excavator 410. It is noted that a third ground-based transponder 406 may be provided as a backup transponder for a system employing a GPS satellite signal 412 in cases where a GPS satellite signal 412 transmission is temporarily terminated. Position data is preferably processed and stored by the geographic positioning unit 254 using the three reference signals 414, 416, and 418 received from the three ground-based radar transponders 404, 406, and 408. An embodiment employing an ultrasonic positioning system 300 would similarly employ three base transponders, 404, 406, and 408 together with a mobile transponder 402 mounted to the excavator 410.

EXCAVATOR DATA ACQUISITION AND CONTROL PROCESS

Figure 17:
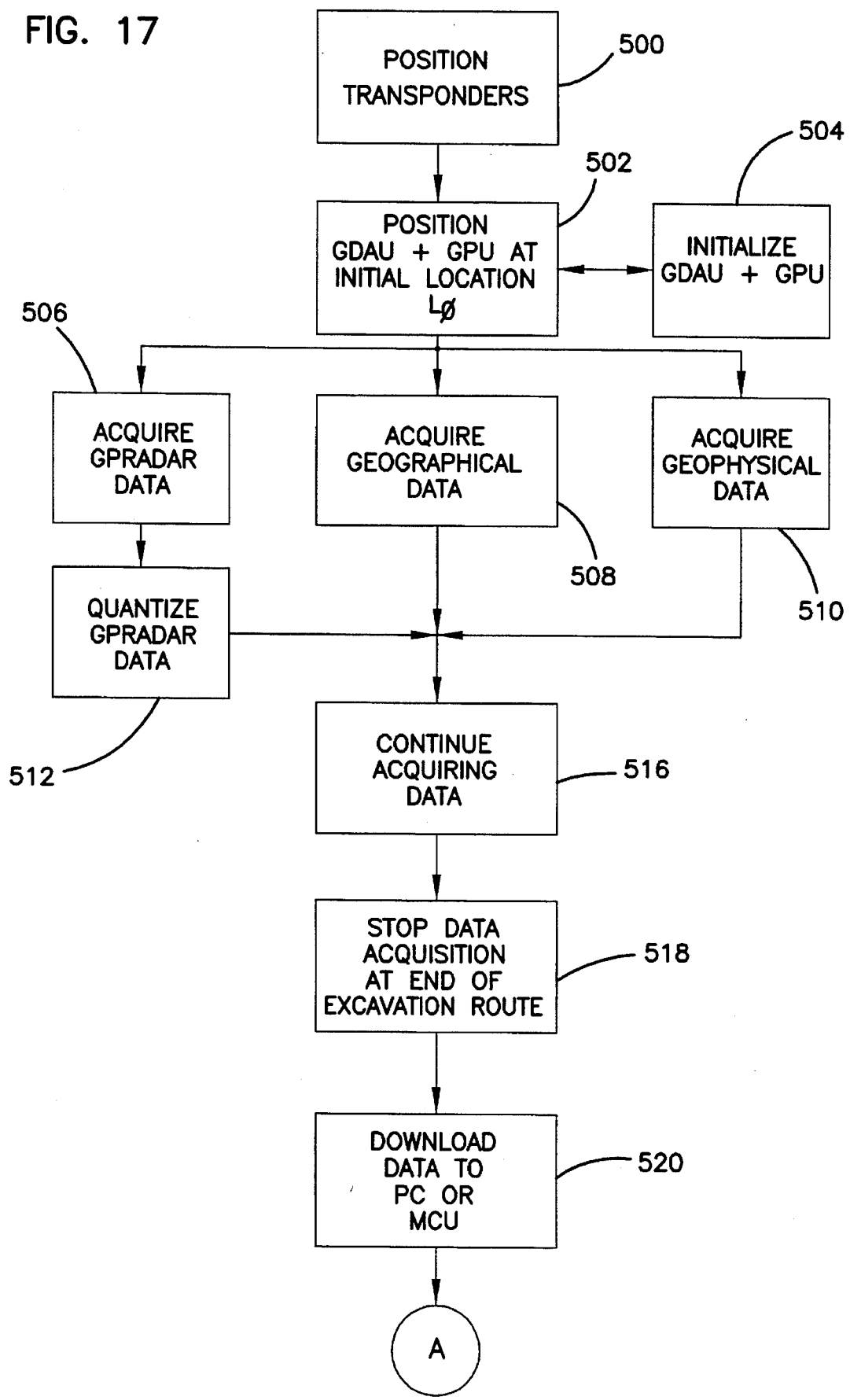
FIGS. 17–20 illustrate in flow diagram form generalized method steps for effecting a novel excavator data acquisition and control process.

Turning now to FIGS. 17–20, there is illustrated in flowchart form generalized process steps associated with the novel excavator data acquisition and control system and process. Initially, as shown in FIG. 17, a number of ground-based transponders are positioned at appropriate locations along a predetermined excavation route at step 500. The geophysic data acquisition unit 256 and geographic positioning unit 254 are then situated at an initial location $L_0$ of the excavation route at step 502. The geologic imaging unit 258, geophysical characterization unit 260, and geographic positioning unit 254 are then initialized or calibrated at step 504. After initialization, the geophysic data acquisition unit 256 and geographic positioning unit 254 are transported along the excavation route, during which GPRadar, position, and geophysical data is acquired at steps 506, 508, and 510. The data acquired by the GPRadar system 282 is preferably digitized and quantized at step 512. Data acquisition continues at step 516 until the end of the excavation route is reached, as at step 518. The acquired data is then preferably downloaded to a PC 252 or directly to the main control unit 250.

Figure 18:
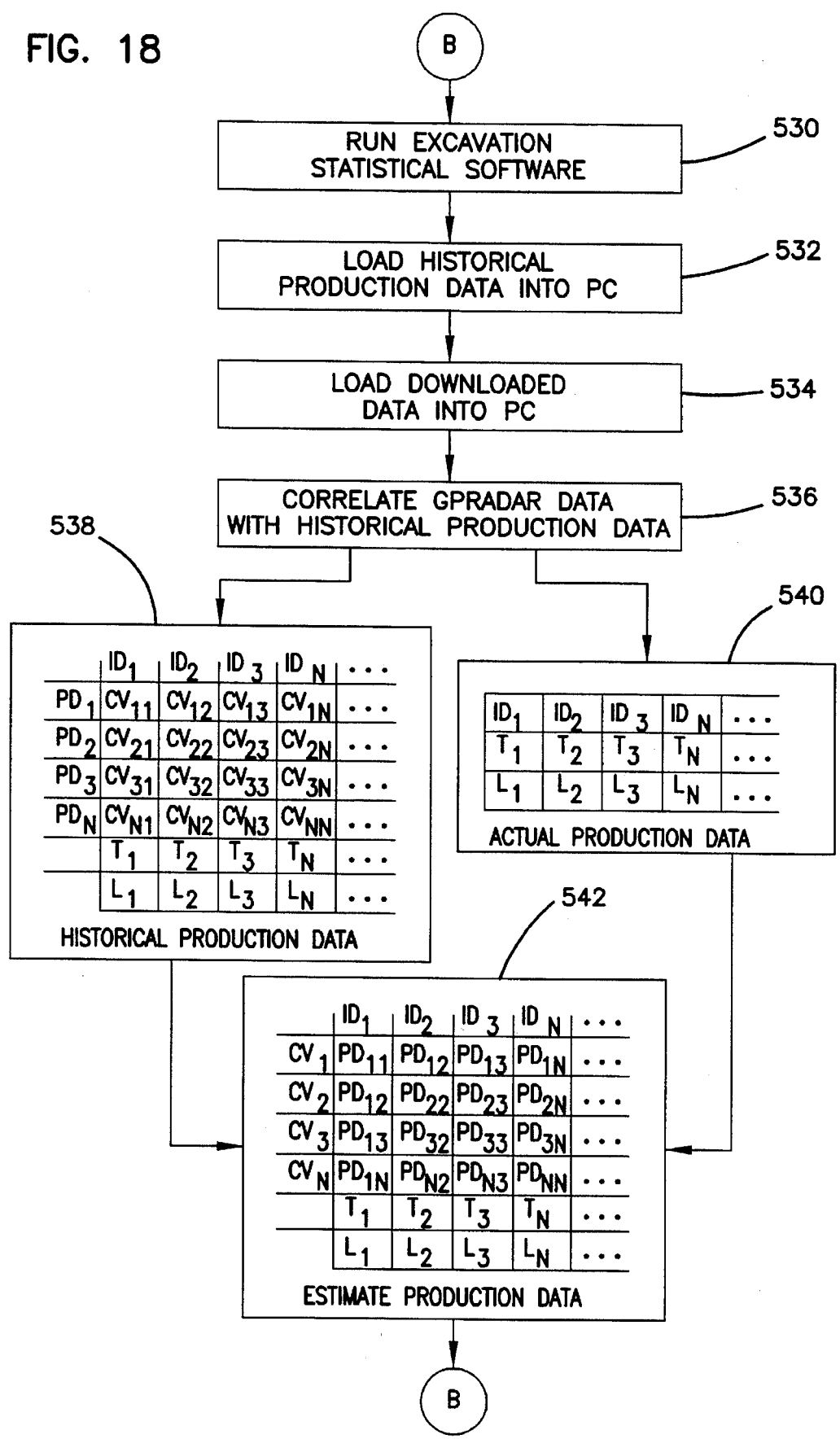

At step 530, shown in FIG. 18, excavation statistical software is preferably executed on the data acquired during the excavation route survey. At step 532, historical excavator production data is transferred from the excavation statistics database 316 to the PC 252. The data acquired during the survey is also loaded into the PC at step 534. The excavation statistical software then performs a correlation between the acquired GPRadar data and the historical excavator production data step 536.

In one embodiment, correlation between GPRadar data and historical production data is accomplished by use of various known matrix manipulation techniques. A historical production data matrix is preferably produced at step 538 by correlating geologic image data ($ID_x$) with corresponding excavator production data ($PD_x$). A correlation value ($CV_{xx}$) is produced corresponding to each pair of geologic image data and production data parameters. The correlation value $CV_{22}$, for example, is a correlation value associated with a statistical correlation between geologic image data parameter $ID_2$ and excavator production data parameter $PD_2$. Associated with each geologic image data parameter is an associated time parameter and location parameter, such as $T_1$ and $L_1$ associated with geologic image data parameter $ID_1$. It can be seen that correlation values associated with a plurality of geologic image data and production data parameter pairs can be produced for time and position increments along a predetermined excavation route.

At step 540, actual geologic image data is acquired over the excavation route and preferably processed as a matrix of discrete geologic image data for corresponding discrete time and location distance increments. At step 542, the matrices produced at steps 538 and 540 are manipulated to produce a correlation matrix in which an estimated or projected production data parameter ($PD_{xx}$) is associated with a pair of corresponding actual geologic image data ($ID_x$) and correlation value ($CV_x$) parameter pairs. For example, an estimated production data parameter $PD_3$ is associated with actual geologic image data parameter $ID_3$ and correlation value parameter $CV_3$. It is noted that each of the estimated production data parameters is associated with a corresponding time and distance location increment.

Figure 19:
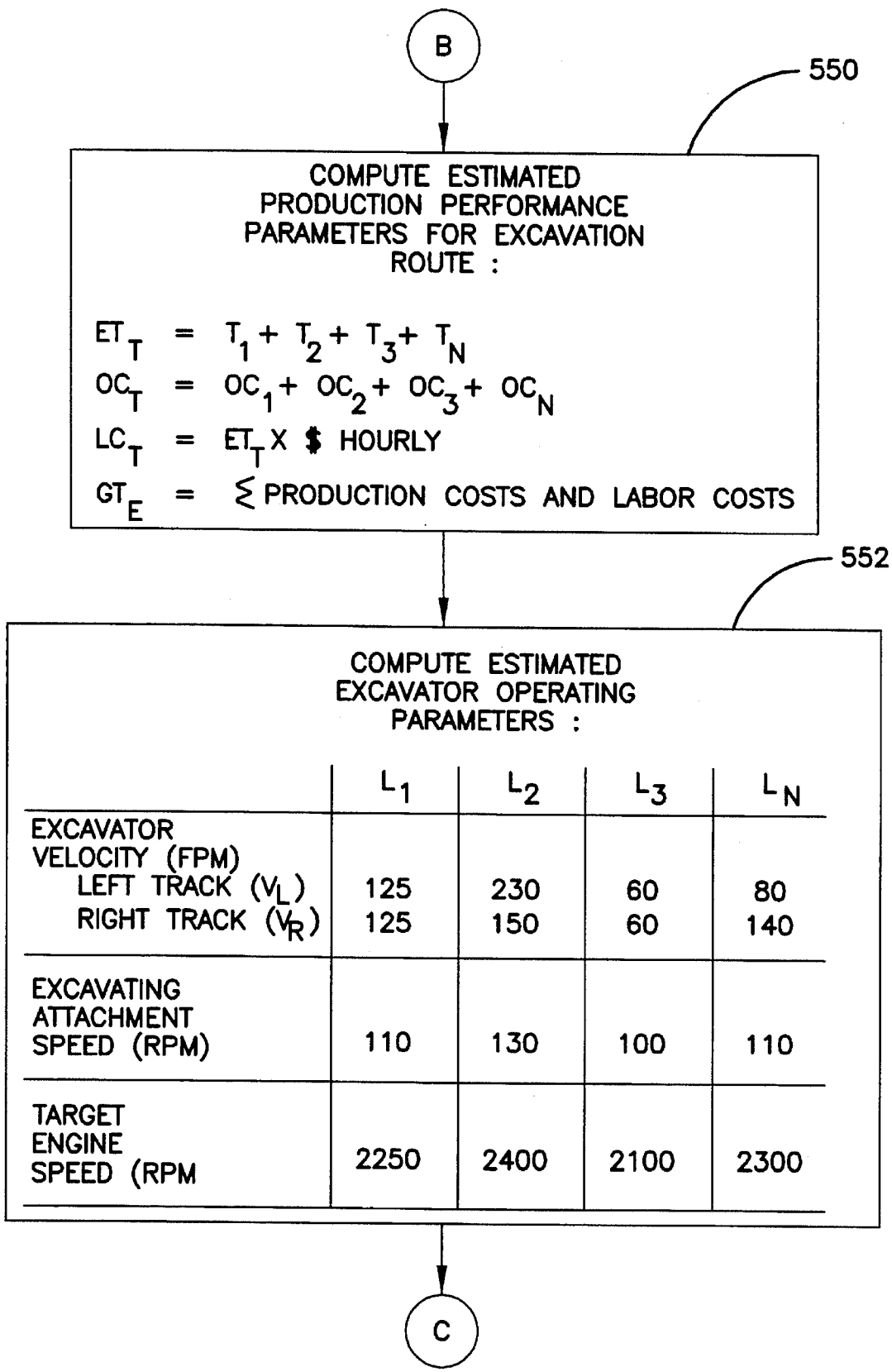

The estimated production performance parameters for a particular excavation route are computed at step 550 as shown in FIG. 19. The total estimated time ($ET_T$) to excavate the entire excavation route can be estimated by summing the discrete time increments $T_1$ through $T_N$. The operational costs associated with excavating the predetermined excavation route can be determined by summing the operational costs associated with each of the discrete portions along the route. The estimated labor costs ($LC_T$) can be estimated by multiplying the total estimated excavation time ($ET_T$) by the total man hour cost per hour. An estimation of the grand total of costs ($GT_E$) can be determined by summing all of the production costs and labor costs associated with excavating the entire route.

At step 552, the estimated excavator operation parameters are computed. For the portion of the excavation route defined between reference location $L_0$ and $L_1$, for example, the estimated production data may indicate an optimal left track velocity ($V_L$) of 125 feet per minute (FPM) and a right track velocity ($V_R$) of 125 FPM. Further, the estimated production data may suggest an optimal excavation attachment speed of approximately 110 RPM and a target engine speed of 2,250 RPM. It is noted that the left and right track velocities $V_L$ and $V_R$ of 125 FPM, respectively, represents straight tracking by the excavator along the excavation route.

It can be seen that along the excavation route defined between location $L_1$ and $L_2$, it is indicated that the excavator is steering in a right direction since the left track velocity $V_L$ of 230 FPM is greater than the right track velocity $V_R$ of 150 FPM. Also, it is indicated that the excavating attachment speed is increasing to 130 RPM, and that the target engine speed is increasing to 2,400 RPM, thus indicating the presence of relatively softer soil within the region defined between locations $L_1$ and $L_2$. Along the excavation route defined between locations $L_2$ and $L_3$, it is indicated that the excavator is again tracking in a straight direction and at a relatively slow velocity of 60 FPM, thus indicating the presence of relatively hard subsurface soil. A corresponding slower excavating attachment speed of 100 RPM and lower target engine speed of 2,100 RPM are indicated due to the slower excavator velocity.

Figure 20:
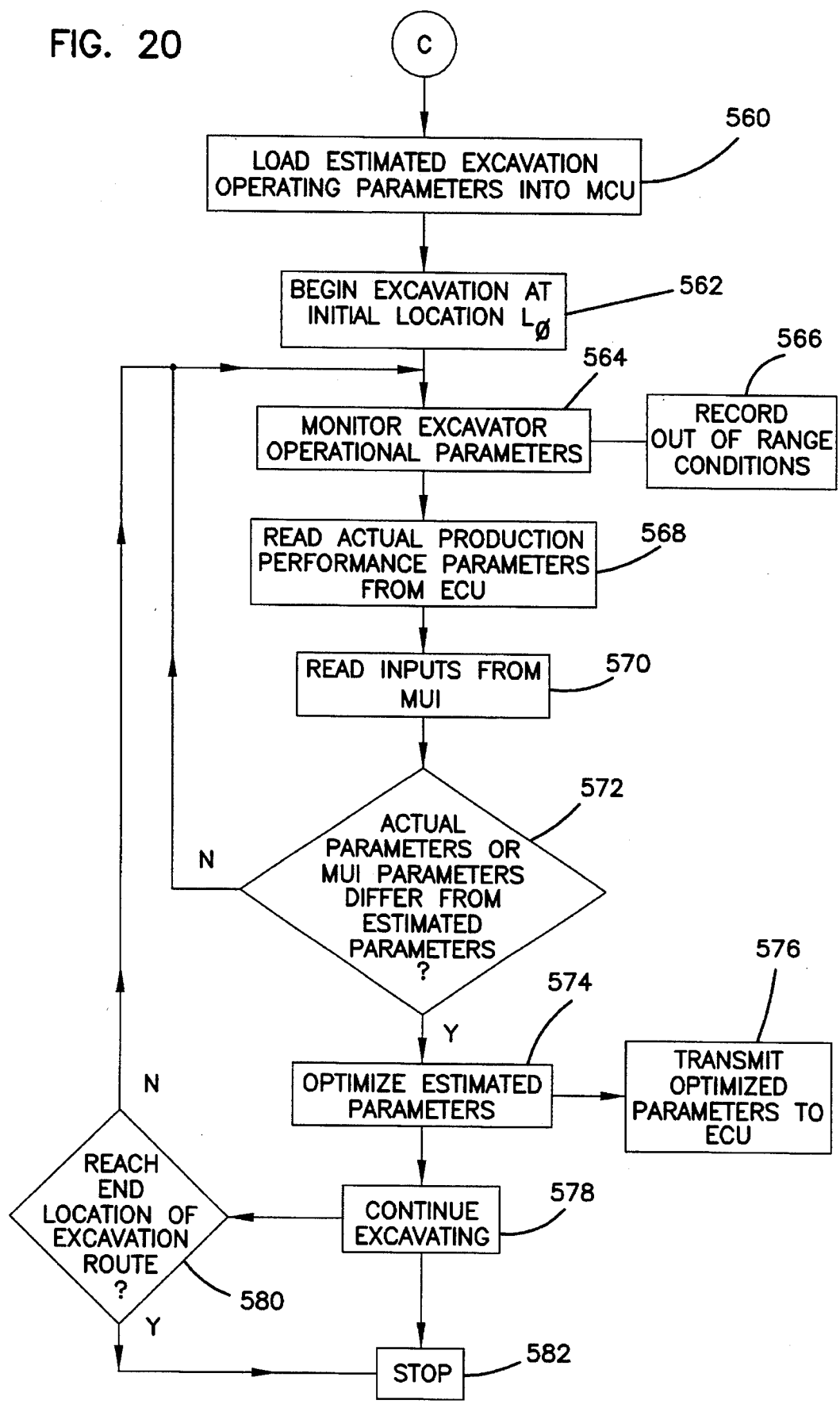

At step 560, as shown in FIG. 20, the estimated excavation operating parameters produced at step 552 are loaded into the main control unit 250. Excavation is initiated beginning at reference location $L_0$ at step 562. At step 564, the main control unit 250 monitors the excavator operational parameters, and out-of-range conditions are recorded in the maintenance log memory 314. Actual production performance parameters are acquired by the excavator control unit 255, at step 568, and transferred to the main control unit 250. Any inputs received from the main user interface 101 are also transferred to the main control unit at step 570. If the actual production performance parameters received from the excavator control unit 255 differ by a predetermined amount from the estimated excavation operation parameters, as tested at step 572, the main control unit 250 optimizes the estimated parameters at step 574, and transmits the optimized parameters to the excavator control unit 255 to effect the necessary changes to excavator operation at step 576. Excavation continues at step 578 until the end location of the predetermined excavation route is reached at step 580, after which the excavation operation is terminated, as at step 582.

It will, of course, be understood that various modifications and additions can be made to the preferred embodiments discussed hereinabove without departing from the scope or spirit of the present invention. Accordingly, the scope of the present invention should not be limited by the particular embodiments discussed above, but should be defined only by the claims set forth below and equivalents of the disclosed embodiments.

What is claimed is:

1. A data acquisition and control system for an excavator, the excavator including propulsion means and excavation means for respectively propelling the excavator and excavating along a predetermined excavation route, the system comprising:

geologic imaging means for acquiring geological information along the predetermined excavation route;

position determining means for determining a position of the excavator along the predetermined excavation route;

excavator control means for coordinating the operation of the propulsion means and the excavating means;

a main user interface for receiving input commands from an operator of the excavator and for displaying information to the operator; and a main controller for receiving the acquired geological information from the geologic imaging means, for receiving position information from the position determining means, and for receiving operational information from the excavator control means;

wherein the main controller includes means for estimating excavator performance parameters in response to the received geological, position, and operational information, and the excavator control means includes means for modifying the operation of the propulsion means and excavating means in response to the estimated excavator performance parameters.

2. A system as claimed in claim 1, wherein the geologic imaging means comprises a ground penetrating radar system.

3. A system as claimed in claim 2, wherein the geologic imaging means further comprises at least two antennas orientated in an orthogonal relationship for transmitting source electromagnetic signals produced by the ground penetrating radar system through a subsurface portion of the predetermined excavation route and for receiving reflected source electromagnetic signals from the subsurface portion to provide three-dimensional imaging of the subsurface geology.

4. A system as claimed in claim 1, wherein the main controller comprises means for correlating the acquired geological information with the position information to produce the estimated excavator performance parameters, and the excavator control means includes means for modifying the operation of the propulsion means and excavating means in response to the estimated performance parameters.

5. A system as claimed in claim 1, wherein the data acquisition and control system further comprises geologic characterization means for determining physical characteristics of a subsurface geology along the predetermined excavation route.

6. A system as claimed in claim 5, wherein the geologic characterization means includes any one of a Schmidt hammer system, point load test system, and a seismic mapping system.

7. A system as claimed in claim 1, wherein the main controller includes means for filtering the acquired geological information with geologic filtering information corresponding to predetermined types of geology to remove acquired geological information content corresponding to the predetermined types of geology.

8. A system as claimed in claim 1, wherein the main controller includes means for receiving historical excavator performance data from an excavator performance database, and for modifying the operation of the propulsion means and excavation means in response to the estimated excavator performance parameters and the historical excavator performance data.

9. A system as claimed in claim 1, wherein the position determining means comprises a Global Positioning System transponder mounted to the excavator and a plurality of ground-based transponders, the Global Positioning System transponder including means for determining the position of the excavator relative to the plurality of ground-based transponders.

10. A system as claimed in claim 1, wherein the position determining means comprises a mobile radar transponder mounted to the excavator and a plurality of ground-based radar transponders, the mobile radar transponder including means for determining the position of the excavator relative to the plurality of ground-based radar transponders.

11. A system as claimed in claim 1, wherein the position determining means comprises a mobile ultra-sonic transponder mounted to the excavator and a plurality of ground-based ultra-sonic transponders, the mobile ultra-sonic transponder including means for determining the position of the excavator relative to the plurality of ground-based ultra-sonic transponders.

12. A system as claimed in claim 1, wherein the data acquisition and control system further comprises mapping means for mapping the predetermined excavation route and excavator deviations from the predetermined excavation route during excavation.

13. A system as claimed in claim 1, wherein the data acquisition and control system further comprises navigation control means for controlling excavator direction along the predetermined excavation route, the navigation control means including means for accessing position information received from the position determining means.

14. A system as claimed in claim 1, wherein the geologic imaging means and position determining means include means for decoupling with the main controller for respectively acquiring geological and position information along the predetermined excavation route prior to excavating the predetermined excavation route.

15. A data acquisition system for acquiring geological information and position information, comprising:

a ground penetrating radar system for transmitting source electromagnetic signals through a subsurface and for receiving and storing reflected source electromagnetic signals reflected by the subsurface;

quantizing means for quantifying the reflected source electromagnetic signal in a digital format;

filtering means for filtering the reflected source electromagnetic signals with geologic filtering data corresponding to predetermined types of subsurface geology to remove reflected source electromagnetic signal content corresponding to the predetermined types of geology;

location determining means for determining the location of the subsurface subjected to the source electromagnetic signals; and user interface means for interfacing with the ground penetrating radar system and the position determining means, and for displaying images representative of the subsurface geology.

16. A system as claimed in claim 15, wherein the ground penetrating radar system comprises at least two antennas orientated in an orthogonal relationship for transmitting the source electromagnetic signals produced by the ground penetrating radar system through the subsurface and for receiving the reflected source electromagnetic signals reflected by the subsurface to provide three-dimensional imaging of the subsurface geology.

17. A system as claimed in claim 15, wherein the position determining means comprises any one of a Global Positioning System positioning system, a ground-based positioning radar system, and a ground-based ultra-sonic positioning system.

18. A system as claimed in claim 15, wherein the system further comprises mapping means for mapping the subsurface subjected to the source electromagnetic signals.

19. A system as claimed in claim 15, further comprising any one of a Schmidt hammer system, point load test system, and a seismic mapping system to characterize the structural mechanics of the subsurface subjected to the source electromagnetic signals.

20. A method for characterizing the subsurface geology of a predetermined excavation route and controlling an excavator along the predetermined excavation route, including the steps of:

transporting a geologic imaging system and a positioning system along the predetermined excavation route;

acquiring geological imaging data and position data for the predetermined excavation route;

storing the acquired geological imaging data and position data in a controller disposed on the excavator; and modifying the excavating operation of the excavator in response to the acquired geological imaging data and position data stored in the controller as the excavator traverses along the predetermined excavation route.

21. A method as claimed in claim 20, including the further step of filtering the acquired geological imaging data with geologic filtering data corresponding to predetermined types of subsurface geology to remove content from the acquired geological imaging data corresponding to the predetermined types of geology.

22. A method as claimed in claim 20, including the further step mapping the predetermined excavation route and deviations from the predetermined excavation route during excavation.

23. A method as claimed in claim 20, wherein the transporting and acquiring steps are performed prior to excavation.

24. A method as claimed in claim 20, including the further step of navigating the excavator along the predetermined excavation route using the acquired position data.

25. A method as claimed in claim 20, wherein the modifying step includes the further step of correlating the acquired geological imaging data with excavator production performance data.

* * * * *